(12) United States Patent
Yamamoto

(10) Patent No.: US 7,341,125 B2
(45) Date of Patent: Mar. 11, 2008

(54) ELECTRIC POWER STEERING APPARATUS

(75) Inventor: Masato Yamamoto, Okazaki (JP)

(73) Assignee: Jtekt Corporation, Chuo-ku (JP)

( * ) Notice: Subject to any disclaimer, the term of this patent is extended or adjusted under 35 U.S.C. 154(b) by 400 days.

(21) Appl. No.: 11/180,731

(22) Filed: Jul. 14, 2005

(65) Prior Publication Data

US 2006/0021822 A1 Feb. 2, 2006

(30) Foreign Application Priority Data

Jul. 27, 2004 (JP) .............................. 2004-219077
Jul. 28, 2004 (JP) .............................. 2004-219601

(51) Int. Cl.
*B62D 5/04* (2006.01)

(52) U.S. Cl. ..................... 180/446; 180/442; 180/444

(58) Field of Classification Search ................ 180/442, 180/444, 446
See application file for complete search history.

(56) References Cited

U.S. PATENT DOCUMENTS

| | | | | |
|---|---|---|---|---|
| 4,972,320 | A * | 11/1990 | Sugiura et al. ................ | 701/43 |
| 5,504,679 | A * | 4/1996 | Wada et al. .................... | 701/41 |
| 5,765,661 | A * | 6/1998 | Matsuoka .................... | 180/446 |
| 6,041,884 | A * | 3/2000 | Shimizu et al. ............. | 180/443 |
| 6,397,969 | B1 * | 6/2002 | Kasai et al. ................ | 180/404 |

FOREIGN PATENT DOCUMENTS

| | | |
|---|---|---|
| EP | 0 863 065 A2 | 9/1998 |
| GB | 2 351 714 A | 1/2001 |
| JP | 10-181616 | 7/1998 |

\* cited by examiner

*Primary Examiner*—Lesley D. Morris
*Assistant Examiner*—Michael Stabley
(74) *Attorney, Agent, or Firm*—Oblon, Spivak, McClelland, Maier & Neustadt, P.C.

(57) ABSTRACT

The invention provides an electric power steering apparatus which can improve a steering feeling. In the electric power steering apparatus, in the case that once the electric abnormality is generated in the hardware such as the motor, the torque sensor or the like and an output of the assist force by the motor is reduced, however, the electric abnormality is thereafter dissolved due to some kind or another reason, the output of the assist force by the motor is increased immediately to an intermediate target value (within a broken line α). Accordingly, it is possible to prevent such a steering feeling as the steering wheel becomes suddenly heavy. Further, since the output of the assist force is gradually increased to a reset target value (within a broken line β) after the output of the assist force by the motor is increased to the intermediate target value, it is possible to prevent such a steering feeling as the steering wheel becomes suddenly light on the basis of the thereafter increase of the assist force even if the steering wheel becomes heavy to some extent. Accordingly, it is possible to smoothly change to the assist at a normal time from the assist at an abnormal time while preventing the steering ineffective feeling, and it is possible to improve the steering feeling.

8 Claims, 10 Drawing Sheets

(A)

(B)

(A)

(B)

ELECTRIC POWER STEERING APPARATUS

CROSS-REFERENCE TO RELATED APPLICATION

The present application claims priority under 35 U.S.C. §119 to Japanese Patent Application No. JP2004-219077 and Japanese Patent Application No. JP2004-219601. The contents of the applications are incorporated herein by reference.

BACKGROUND OF THE INVENTION

1. Field of the Invention

The present invention relates to an electric power steering apparatus assisting a steering on the basis of an assist force of a motor.

2. Description of the Related Art

An electric power steering apparatus is generally constituted by a motor outputting an assist force capable of assisting a steering by a steering wheel, a torque sensor detecting a steering torque by the steering wheel, a computing means for computing a current command value of the motor on the basis of the steering torque, and a control means for controlling a generation of the assist force by the motor on the basis of the current command value. For example, the computing means is achieved by an electronic control unit (ECU), and the control means is achieved by a motor drive circuit, respectively. Further, the torque sensor and the ECU, the ECU and the motor drive circuit, and the motor drive circuit and the motor are electrically connected therebetween by a wire harness (a connecting means), respectively, whereby it is possible to exchange a sensor signal and various control signals and the like sent and received therebetween.

In this case, since the electric power steering apparatus constituted by hardwares such as the motor, the torque sensor, the ECU, the motor drive circuit, the wire harness and the like is generally mounted in a vehicle, there is a case that electric characteristics of the hardwares are affected by a vibration applied from an engine or a road surface, a temperature and humidity change applied from a circumferential environment, an exhaust gas, a dust or an aged deterioration, and an abnormality of the hardwares is caused. In particular, in a connector connecting the wire harnesses and a connector connecting the wire harness and a circuit board such as the ECU or the like, an electric contact failure is caused by the vibration and the aged deterioration, and there can be considered that the wire harness is damaged by a pebble or the like thrown up by a tire wheel during traveling on a gravel road or the like and the wire harness reaches a disconnection due to the damage.

For example, the abnormality of the hardware caused by the contact failure of the connector, a soldering failure of a circuit part or the like is not necessarily always generated in accordance with the condition of the vibration and the temperature and humidity change, and there is a case that the abnormality is generated and a case that the abnormality is not generated, in accordance with the condition of the time. Accordingly, in the electric power steering apparatus as mentioned above, there is employed a structure which can execute a failsafe control of setting an assist torque (an assist force) of the motor to zero at a time when an abnormality is generated, thereby preventing a secondary failure from being generated, and execute a control of rising the assist torque of the motor to a rated value in the case of determining that the state is returned from the generation of abnormality to a normal state, for example, as in "motor-driven steering apparatus" disclosed in prior art mentioned below.

Further, when rising the assist torque, the control is executed in such a manner that the torque is gradually increased to the rated value only while a driver steers, without exponentially increasing the torque, whereby a sudden change of the assist torque is prevented, and an uncomfortable feeling of the steering is not applied to the driver.

[Prior Art] JP 10-181616 A is incorporated herein by reference.

However, in accordance with the "motor-driven steering apparatus" disclosed in the prior art, since the assist torque is gradually increased without being exponentially increased at a time of rising the assist torque for returning to the normal state from the abnormal state, such a steering feeling as a steering wheel becomes suddenly light, that is, such a steering feeling as "the steering is not effective" is not applied, but the control of increasing the assist torque as mentioned above is executed limitedly at the steering time by the driver.

Accordingly, even if the hardwares are returned to the normal state, the assist torque by the motor does not rise to the rated value until the steering operation is executed by the driver. Therefore, in the case that the steering operation is not executed, the assist torque is not returned. As far as the generation of the assist torque aims to assist the steering force by the driver, it is apparently rational to limit the increase of the assist torque to the steering time on the basis of the control mentioned above. However, in the case that the abnormality is generated in the hardware under the condition that the steering operation is not executed and is immediately recovered, the steering operation is not executed by the driver in the mean time. Therefore, the assist is not executed at a time of starting the steering operation thereafter. Accordingly, since such a steering feeling as the steering wheel becomes suddenly heavy is applied to the driver in the case mentioned above, there is a problem that the deterioration of the steering feeling is caused.

SUMMARY OF THE INVENTION

The present invention is made by solving the problem mentioned above, and an object of the present invention is to provide an electric power steering apparatus which can improve a steering feeling.

In order to achieve the above object, an electric power steering apparatus comprises:

an abnormality detecting means for detecting an electric abnormality of at least one of hardwares including a motor, a torque sensor, a computing means, a control means and connecting means for electrically connecting them respectively;

an abnormal time control means for controlling said control means in such a manner that an output of the assist force by said motor is reduced in the case that the electric abnormality of said hardware is detected by said abnormality detecting means;

a first resetting control means for controlling said control means in such a manner that the output of the assist force by said motor is immediately increased to a predetermined intermediate value in the case that said electric abnormality is not detected by said abnormality detecting means after detecting the electric abnormality of said hardware by said abnormality detecting means; and a second resetting control means for controlling said control means in such a manner that the output of the assist force by said motor is gradually increased to a predetermined reset value after the output of the assist force by said motor is increased to said predetermined intermediate value by said first resetting control means.

Accordingly, in the case that once the electric abnormality is generated in the hardware such as the motor, the torque sensor or the like and an output of the assist force by the motor is reduced, however, the electric abnormality is thereafter dissolved due to some kind or another reason, the output of the assist force by the motor is increased immediately to a predetermined intermediate value (for example, such an assist force as the ineffectiveness of the steering is not generated). Accordingly, it is possible to prevent such a steering feeling as the steering wheel becomes suddenly heavy. Further, since the output of the assist force is gradually increased to a predetermined reset value after the output of the assist force by the motor is increased to the predetermined intermediate value, a rotation of the steering wheel becomes suddenly light on the basis of the thereafter increase of the assist force even if the steering wheel becomes heavy to some extent. In other words, it is possible to prevent such a steering feeling as "the steering is suddenly ineffective" from being applied.

In the case that an abnormality duration t from a time when the electric abnormality of the hardware is detected to a time when the electric abnormality is not detected is less than a predetermined time (for example, 0<t<1 second), by employing the means in accordance with the more preferred teaching of the present invention, the predetermined reset value corresponds to the assist force by the motor output on the basis of the current command value stored in the memory means just before detecting the electric abnormality, and the predetermined intermediate value is approximately one half of the predetermined reset value. Accordingly, in the case that once the electric abnormality is generated in the hardware such as the motor, the torque sensor or the like and the output of the assist force by the motor is reduced, and the electric abnormality is thereafter dissolved for a short time (for example, 0<t<1 second) due to some kind or another reason, the assist force is increased immediately to the predetermined intermediate value, and is thereafter increased gradually to the predetermined reset value (the assist force by the motor output on the basis of the current command value stored in the memory means just before detecting the electric abnormality). Even if the steering feeling that the steering wheel becomes heavy to some extent is temporarily applied to the driver, it is possible to thereafter apply the steering feeling just before detecting the electric abnormality to the driver.

In the case that the abnormality duration t from the time when the electric abnormality of the hardware is detected to the time when the electric abnormality is not detected is equal to or more than the predetermined time (for example, 1 second≦t), by employing the means in accordance with the more preferred teaching of the present invention, the predetermined reset value corresponds to a previously set predetermined assist force (for example, 80% of the maximum assist force), and the predetermined intermediate value is approximately one half of the predetermined reset value (for example, 40% of the maximum assist force). Accordingly, in the case that once the electric abnormality is generated in the hardware such as the motor, the torque sensor or the like and the output of the assist force by the motor is reduced, and the electric abnormality is thereafter dissolved after a long time has passed (for example, 1 second≦t) due to some kind or another reason, the assist force is increased immediately to the predetermined intermediate value, and is thereafter increased gradually to the predetermined reset value (the previously set predetermined assist force). Accordingly, even if the steering feeling that the steering wheel becomes heavy to some extent is temporarily applied to the driver, it is possible to thereafter apply the steering feeling on the basis of the previously set predetermined assist force to the driver. In other words, in the case mentioned above, since a long time has passed after the electric failure of the hardware is detected, there is a high possibility that the different steering operation from the steering operation before detecting the electric abnormality is executed by the driver. Accordingly, the assist force is immediately increased to the previously set predetermined intermediate value without reference to the current command value stored in the memory means just before detecting the electric abnormality, and is thereafter increased gradually to the previously set predetermined assist force.

In order to achieve the above object, an electric power steering apparatus comprises:

an abnormality detecting means for detecting an electric abnormality of at least one of hardwares including a motor, a torque sensor, a computing means, a control means and connecting means for electrically connecting them respectively;

an abnormal time control means for controlling said control means in such a manner that an output of the assist force by said motor is reduced in the case that the electric abnormality of said hardware is detected by said abnormality detecting means, and a reset time control means for controlling said control means in such a manner that the output of the assist force by said motor is immediately increased to a predetermined reset value if the abnormality duration measured by a clocking means is less than a predetermined time, in the case that said electric abnormality is not detected by said abnormality detecting means after detecting the electric abnormality of said hardware by said abnormality detecting means, and in such a manner that the output of the assist force by said motor is gradually increased to a predetermined reset value if said abnormality duration is equal to or more than the predetermined time. In this case, "abnormality duration" means a time which has passed from the time when the electric abnormality of the hardware is detected to the time when the electric abnormality is not detected.

Accordingly, in the case that once the electric abnormality is generated in the hardware such as the motor, the torque sensor or the like and the output of the assist force by the motor is reduced, however, the electric abnormality is thereafter dissolved due to some kind or another reason, and the abnormality duration during the time is less than the predetermined time, the output of the assist force by the motor is increased immediately to the predetermined reset value. Accordingly, it is possible to prevent such a steering feeling as the steering wheel becomes suddenly heavy. On the other hand, since the output of the assist force by the motor is gradually increased in the case that the abnormality duration is equal to or more than the predetermined time, the rotation of the steering wheel becomes suddenly light on the basis of the thereafter slow increase of the assist force even if the steering wheel becomes heavy to some extent. In other words, it is possible to prevent such a steering feeling as "the steering is suddenly ineffective" from being applied.

In order to achieve the above object, an electric power steering apparatus comprises:

an abnormality detecting means for detecting an electric abnormality of at least one of hardwares including a motor, a torque sensor, a computing means, a control means and connecting means for electrically connecting them respectively;

an abnormal time control means for controlling said control means in such a manner that an output of the assist force by said motor is reduced in the case that the electric abnormality of said hardware is detected by said abnormality detecting means, and a reset time control means for controlling said control means on the basis of said abnormality duration in such a manner that a speed for increasing the output of the assist force by said motor to a predetermined reset value becomes faster in accordance with said abnormality duration being shorter and becomes slower in accordance with said abnormality duration being longer, in the case that said electric abnormality is not detected by said abnormality detecting means after detecting the electric abnormality of said hardware by said abnormality detecting means.

Accordingly, since the speed at which the assist force is increased is controlled on the basis of the abnormality duration in the case that once the electric abnormality is generated in the hardware such as the motor, the torque sensor or the like and the output of the assist force by the motor is reduced, however, the electric abnormality is thereafter dissolved due to some kind or another reason, the assist force is suddenly increased in accordance that the abnormality duration time is shorter, and the assist force is slowly increased in accordance that the abnormality duration is longer. Accordingly, in the case that the abnormality duration is extremely short (for example, some milliseconds), the output of the assist force by the motor is exponentially increased to the predetermined reset value. Therefore, it is possible to prevent such a steering feeling as the steering wheel becomes suddenly heavy. On the other hand, since the output of the assist force by the motor is slowly increased in the case that the abnormality duration is extremely long (for example, some seconds), the rotation of the steering wheel becomes suddenly light on the basis of the thereafter slow increase of the assist force even if the steering wheel becomes heavy to some extent. In other words, it is possible to prevent such a steering feeling as "the steering is suddenly ineffective" from being applied.

Since the predetermined reset value corresponds to the assist force by the motor output on the basis of the current command value stored in the memory means just before detecting the electric abnormality in the case that the abnormality duration is less than the predetermined time, by employing the means in accordance with the more preferred teachings of the present invention, the output of the assist force by the motor is immediately increased on the basis of the current command value just before detecting the electric abnormality. Accordingly, in the case that the abnormality duration is less than the predetermined time, it is possible to apply the steering feeling just before detecting the electric abnormality to the driver.

According to the present invention, in the case that once the electric abnormality is generated in the hardware such as the motor, the torque sensor or the like and an output of the assist force by the motor is reduced, however, the electric abnormality is thereafter dissolved due to some kind or another reason, the output of the assist force by the motor is increased immediately to a predetermined intermediate value (for example, such an assist force as the ineffectiveness of the steering is not generated). Accordingly, it is possible to prevent such a steering feeling as the steering wheel becomes suddenly heavy. Further, since the output of the assist force is gradually increased to a predetermined reset value after the output of the assist force by the motor is increased to the predetermined intermediate value, a rotation of the steering wheel becomes suddenly light on the basis of the thereafter increase of the assist force even if the steering wheel becomes heavy to some extent. In other words, it is possible to prevent such a steering feeling as "the steering is suddenly ineffective" from being applied. Accordingly, since it is possible to smoothly change to the assist at the normal time from the assist at the abnormal time while preventing the steering ineffective feeling, it is possible to improve the steering feeling.

According to the present invention, in the case that once the electric abnormality is generated in the hardware such as the motor, the torque sensor or the like and the output of the assist force by the motor is reduced, and the electric abnormality is thereafter dissolved for a short time (for example, $0 < t \leq 1$ second) due to some kind or another reason, the assist force is increased immediately to the predetermined intermediate value, and is thereafter increased gradually to the predetermined reset value (the assist force by the motor output on the basis of the current command value stored in the memory means just before detecting the electric abnormality). Even if the steering feeling that the steering wheel becomes heavy to same extent is temporarily applied to the driver, it is possible to thereafter apply the steering feeling just before detecting the electric abnormality to the driver. Accordingly, since it is possible to smoothly change to the assist just before the abnormality is generated, that is, the assist at the normal time while preventing the steering ineffective feeling, it is possible to improve the steering feeling.

According to the present invention, in the case that once the electric abnormality is generated in the hardware such as the motor, the torque sensor or the like and the output of the assist force by the motor is reduced, and the electric abnormality is thereafter dissolved after a long time has passed (for example, $1 \text{ second} \leq t$) due to sane kind or another reason, the assist force is increased immediately to the predetermined intermediate value, and is thereafter increased gradually to the predetermined reset value (the previously set predetermined assist force). Accordingly, even if the steering feeling that the steering wheel becomes heavy to some extent is temporarily applied to the driver, it is possible to thereafter apply the steering feeling on the basis of the previously set predetermined assist force to the driver. In other words, in the case mentioned above, since a long time has passed after the electric failure of the hardware is detected, there is a high possibility that the different steering operation from the steering operation before detecting the electric abnormality is executed by the driver. Accordingly, since it is possible to smoothly change to the assist at the normal time while preventing the steering ineffective feeling, by gradually increasing the assist force to the previously set predetermined assist force after immediately increasing to the previously set predetermined intermediate value, without relation to the current command value stored in the memory means just before detecting the electric abnormality, it is possible to improve the steering feeling.

According to the present invention, in the case that once the electric abnormality is generated in the hardware such as the motor, the torque sensor or the like and the output of the assist force by the motor is reduced, however, the electric abnormality is thereafter dissolved due to some kind or another reason, and the abnormality duration during the time is less than the predetermined time, the output of the assist force by the motor is increased immediately to the predetermined reset value. Accordingly, it is possible to prevent such a steering feeling as the steering wheel becomes suddenly heavy. On the other hand, since the output of the assist force by the motor is gradually increased in the case that the abnormality duration is equal to or more than the predetermined time, the rotation of the steering wheel becomes suddenly light on the basis of the thereafter slow increase of the assist force even if the steering wheel becomes heavy to some extent. In other words, it is possible to prevent such a steering feeling as "the steering is suddenly ineffective" from being applied. Accordingly, since it is determined in accordance with the length of the abnormality duration whether the assist force is suddenly increased or gradually increased, it is possible to improve the steering feeling.

According to the present invention, since the speed at which the assist force is increased is controlled on the basis of the abnormality duration in the case that once the electric abnormality is generated in the hardware such as the motor, the torque sensor or the like and the output of the assist force by the motor is reduced, however, the electric abnormality is thereafter dissolved due to some kind or another reason, the assist force is suddenly increased in accordance that the abnormality duration time is shorter, and the assist force is slowly increased in accordance that the abnormality duration is longer. Accordingly, in the case that the abnormality duration is extremely short (for example, some milliseconds), the output of the assist force by the motor is exponentially increased to the predetermined reset value. Therefore, it is possible to prevent such a steering feeling as the steering wheel becomes suddenly heavy. On the other hand, since the output of the assist force by the motor is slowly increased in the case that the abnormality duration is extremely long (for example, some seconds), the rotation of the steering wheel becomes suddenly light on the basis of the thereafter slow increase of the assist force even if the steering wheel becomes heavy to some extent. In other words, it is possible to prevent such a steering feeling as "the steering is suddenly ineffective" from being applied. Accordingly, since it is determined in accordance with the length of the abnormality duration whether the assist force is suddenly increased or gradually increased, it is possible to improve the steering feeling.

In the invention in accordance with the more preferred teachings of the present invention, in the case that the abnormality duration is less than the predetermined time, it is possible to apply the steering feeling just before detecting the electric abnormality to the driver. Accordingly, it is possible to further improve the steering feeling.

BRIEF DESCRIPTION OF THE DRAWINGS

FIG. 1A is a schematic view showing an example of an entire structure of an electric power steering apparatus in accordance with a first embodiment of the present invention;

FIG. 1B is a circuit block diagram showing an example of a structure of an ECU or the like;

FIGS. 8A and 8B are characteristic views showing an example of an assist level obtained in accordance with the abnormal time resetting process shown in FIG. 7, in which FIG. 8A is a characteristic view in the case that an abnormality duration t1 is equal to or more than a predetermined threshold time th, and FIG. 8B is a characteristic view in the case that an abnormality duration t2 is shorter than the predetermined threshold time th;

DESCRIPTION OF THE PREFERRED EMBODIMENTS

First Embodiment

Figure 1:
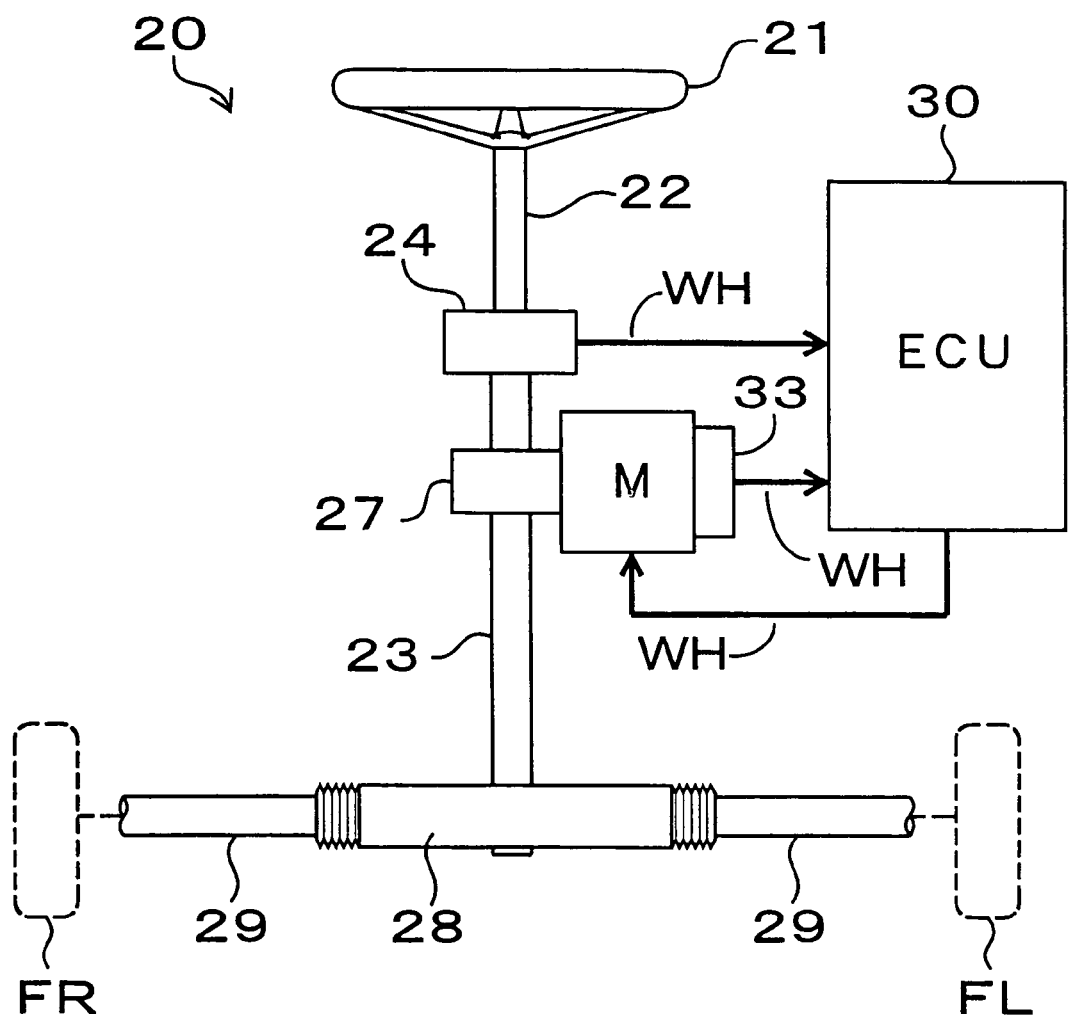
Figure 1:
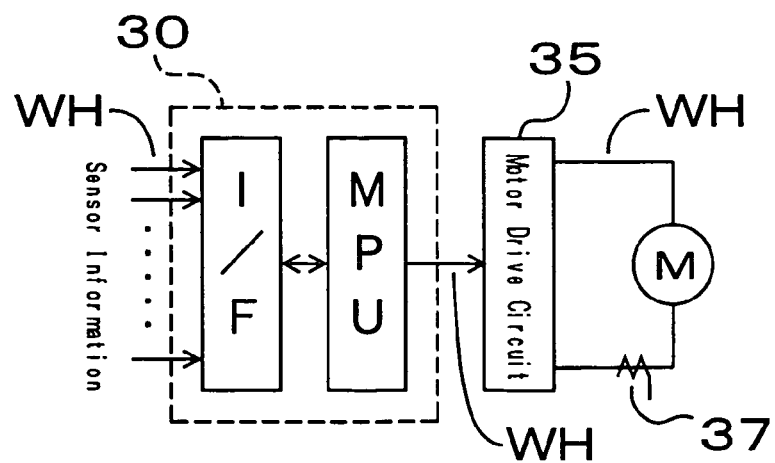

A description will be given below of a first embodiment in accordance with the electric power steering apparatus on the basis of FIGS. 1 to 6. First, a description will be given of a structure of a hardware of an electric power steering apparatus 20 in accordance with the first embodiment with reference to FIGS. 1A and 1B.

As shown in FIG. 1A, the electric power steering apparatus 20 is an apparatus for assisting a steering of a vehicle such as a motor vehicle or the like in connection with a steering force, and mainly constituted by a steering wheel 21, a steering shaft 22, a pinion input shaft 23, a torque sensor 24, a speed reduction gear 27, a rack and pinion 28, a rod 29, a motor M, an ECU 30, a motor rotation angle sensor 33 and the like.

As shown in FIG. 1A, one end side of the steering shaft 22 is connected to the steering wheel 21, and an input side of the torque sensor 24 is connected to the other end side of the steering shaft 22. Further, one end side of the pinion input shaft 23 of the rack and pinion 28 is connected to an output side of the torque sensor 24. The torque sensor 24 is constituted by a torsion bar (not shown), and two resolvers attached to both ends of the torsion bar so as to pinch the torsion bar therebetween, and is structured such that the torque sensor 24 can detect a steering torque Th and an angle of the steering wheel θH by the steering wheel 21 by detecting a torsion amount of the torsion bar or the like generated between an input and an output in which one end side of the torsion bar is set as the input and the other end side is set as the output.

The speed reduction gear 27 is coupled to a halfway of the pinion input shaft 23 connected to the output side of the torque sensor 24, and the structure is made such that the assist force output from the motor M can be transmitted to the pinion input shaft 23 via the speed reduction gear 27. The motor rotation angle sensor 33 serving as a motor rotational direction detecting means which can detect a rotation angle θM of the motor M is attached to the motor M, and a drive control of the motor M by the ECU 30 is executed on the basis of the motor rotation angle θM, the steering torque Th by the torque sensor 24, the angle of the steering wheel θH or the like.

On the other hand, a pinion gear which can engage with a rack groove of a rack shaft (not shown) constituting the rack and pinion 28 is formed in the other end side of the pinion input shaft 23. The rack and pinion 28 can convert a rotational motion of the pinion input shaft 23 into a linear motion of the rack shaft, a rod 29 is coupled to both ends of the rack shaft, and driven wheels FR and FL are coupled to an end portion of the rod 29 via a knuckle (not shown) or the like. Accordingly, when the pinion input shaft 23 is rotated, it is possible to change an actual steering angle θTir of the driven wheels FR and FL via the rack and pinion 28, the rod 29 or the like. Accordingly, it is possible to steer the driven wheels FR and FL in accordance with a rotation amount and a rotation direction of the pinion input shaft 23.

The ECU 30 is mainly constituted, as shown in FIG. 1B, by a micro processor unit (MPU) provided with a peripheral LSI such as an A/D converter or the like, a semiconductor memory apparatus and the like, an input and output interface I/F which can input and output variable sensor information (a steering torque signal, a signal of the steering wheel, a motor rotation angle signal and a vehicle speed signal) by the torque sensor 24, the motor rotation angle sensor 33, a vehicle speed sensor (not shown) or the like, and a motor drive circuit 35 which can supply a motor current in accordance with a PWM control to the motor M on the basis of the motor current command output from the MPU. In this case, an abnormal time resetting program or the like which can execute an abnormal time resetting process mentioned below is installed in the semiconductor memory apparatus (hereinafter, refer to as a "memory") of the MPU.

The torque sensor 24, the motor rotation angle sensor 33 and the vehicle speed sensor, and the ECU 30, the motor drive circuit 35 of the ECU 30 and the motor M, or the ECU 30 and a battery (a direct current power supply apparatus) are electrically connected therebetween by a wire harness WH or a connector (not shown), respectively. In this case, reference numeral 37 shown in FIG. 1B denotes a current sensor 37 which can detect a motor current actually flowing through the motor M. The ECU 30 and the current sensor 37 are electrically connected therebetween by the wire harness WH or the connector in such a manner that a sensor information relating to the motor current detected by the current sensor 37 can be input as a motor current signal to the MPU via an input and output interface I/F. The wire harness WH and the connector may correspond to "connecting means" described in claims.

In accordance with the structure mentioned above, in the electric power steering apparatus 20 mounted to the vehicle, it is possible to detect a steering torque Th by the steering wheel 21 by the torque sensor 24, and it is possible to detect a traveling speed (a vehicle speed) V of the vehicle by the vehicle speed sensor. Further, it is possible to compute a motor current command value iq* in correspondence to the steering torque Th and the vehicle speed V by the MPU of the ECU 30, and it is possible to control a generation of an assist force by the motor M on the basis of the motor current command value iq* by means of the motor drive circuit 35. Accordingly, the electric power steering apparatus 20 can assist a steering operation by the steering wheel 21 of a driver of the vehicle on the basis of the assist force of the motor M generated in accordance with the steering torque Th and the vehicle speed V.

Figure 2:
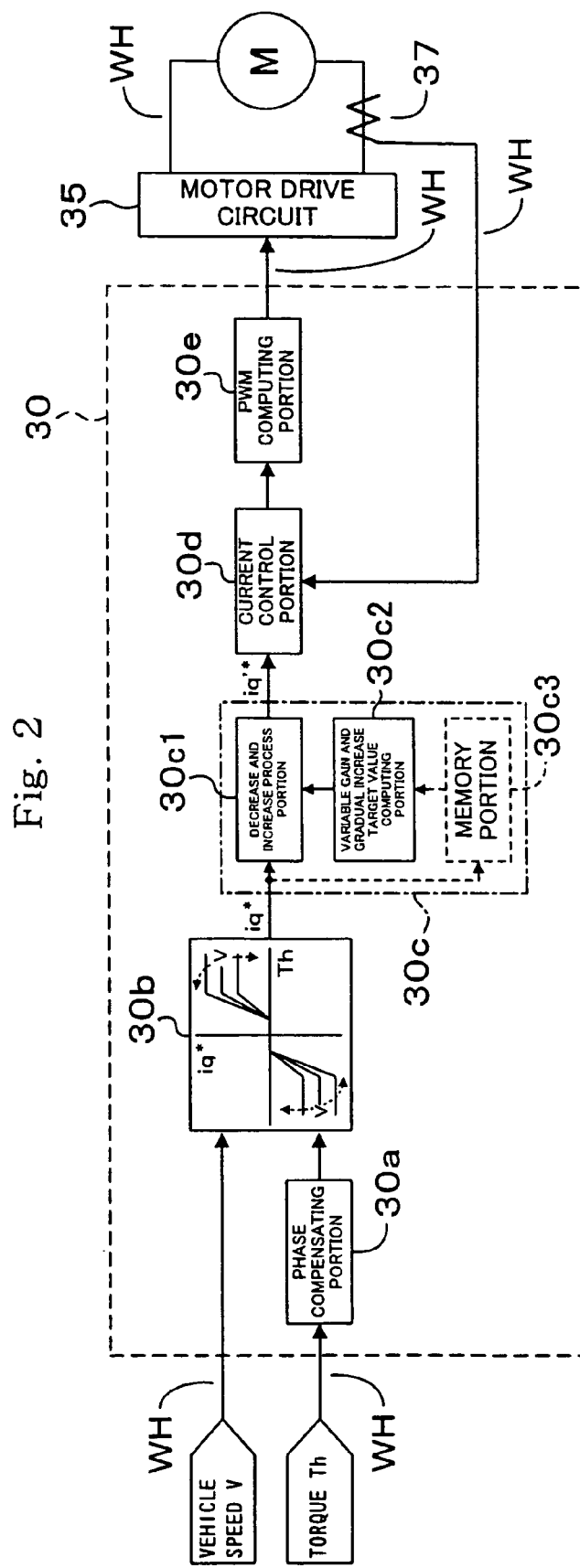
FIG. 2 is a control block diagram showing a control outline by the ECU of the electric power steering apparatus in accordance with the first embodiment.

Next, a description will be given of an outline of an assist force control process by the ECU 30 and the motor drive circuit 35 on the basis of FIG. 2. The assist force control executed by the MPU of the ECU 30 is constituted by a phase compensating portion 30a, a current command value computing portion 30b, an abnormal time resetting process portion 30c, a current control portion 30d and a PWM computing portion 30e. In this case, the abnormal time resetting process portion 30c is structured such as to be controlled in accordance with an abnormal time resetting process (FIG. 3) in the case that an electric abnormality (hereinafter, refer to as "abnormality") is generated in at least one of hardwares such as the torque sensor 24, the ECU 30, the motor rotation angle sensor 33, the motor drive circuit 35, the current sensor 37, the wire harness WH or the connector electrically connecting them, and the like. Accordingly, a detailed description is not given of contents of the control by the abnormal time resetting process portion 30c, but will be given together with a description of the abnormal time resetting process shown in FIG. 3.

First, when the steering torque Th detected by the torque sensor 24 is input to the MPU via the input and output interface I/F, the steering torque Th is output to the current command value computing portion 30b after a phase compensating process is executed by the phase compensating portion 30a for improving a stability of the electric power steering apparatus 20. Since the vehicle speed V detected by the vehicle speed sensor (not shown) is also input to the current command value computing portion 30b to which the steering torque Th having the compensated phase is input, the current command value computing portion 30b computes the current command value iq* in correspondence to the steering torque Th and the vehicle speed V on the basis of the assist map previously stored in the memory of the MPU. Since the current command value computing portion 30b executes the computation of the current command value iq* in correspondence to the vehicle speed as well as the steering torque Th, the current command value computing portion 30b computes the current command value iq*, for example, in such a manner as to output a great assist force in the case that the vehicle speed V is small, and output a small assist force in the case that the vehicle speed V is large. In other words, a so-called vehicle speed depending type current command value computation is executed.

In the case that the hardware such as the torque sensor 24 or the like is normal (is not abnormal), a value 1 is set in a variable gain Gv by a variable gain and gradual increase target value outing portion 30c2 as mentioned below. Accordingly, a gain variable subsequent current command value iq'* is output to the current control portion 30d in accordance with a decrease and increase process portion 30c1, by executing a computation obtained by multiplying the current command value iq* computed by the current command value computing portion 30b by the variable gain Gv (=1) by the variable gain and gradual increase target value computing portion 30c2. Accordingly, at the normal time of the hardware, the current command value iq* output from the current command value computing portion 30b is output as the gain variable subsequent current command value iq'* (in this case, iq'*=iq*) to the current control portion 30d without subsequently executing anything in the abnormal time resetting process portion 30c.

The current control portion 30d to which the gain variable subsequent current command value iq'*(=iq*) is input computes a PI control value or a PID control value on the basis of a signal corresponding to a difference from an actual motor current detected by the current sensor 37, and outputs the control value to a PWM computing portion 30e. The PWM computing portion 30e executes a PWM computation in correspondence to the control value, and outputs a PWM control signal corresponding to a computed result to the motor drive circuit 35. As a result, the motor drive circuit 35 can generate a proper assist force by the motor M by controlling a drive of the motor M on the basis of the control signals.

Figure 3:
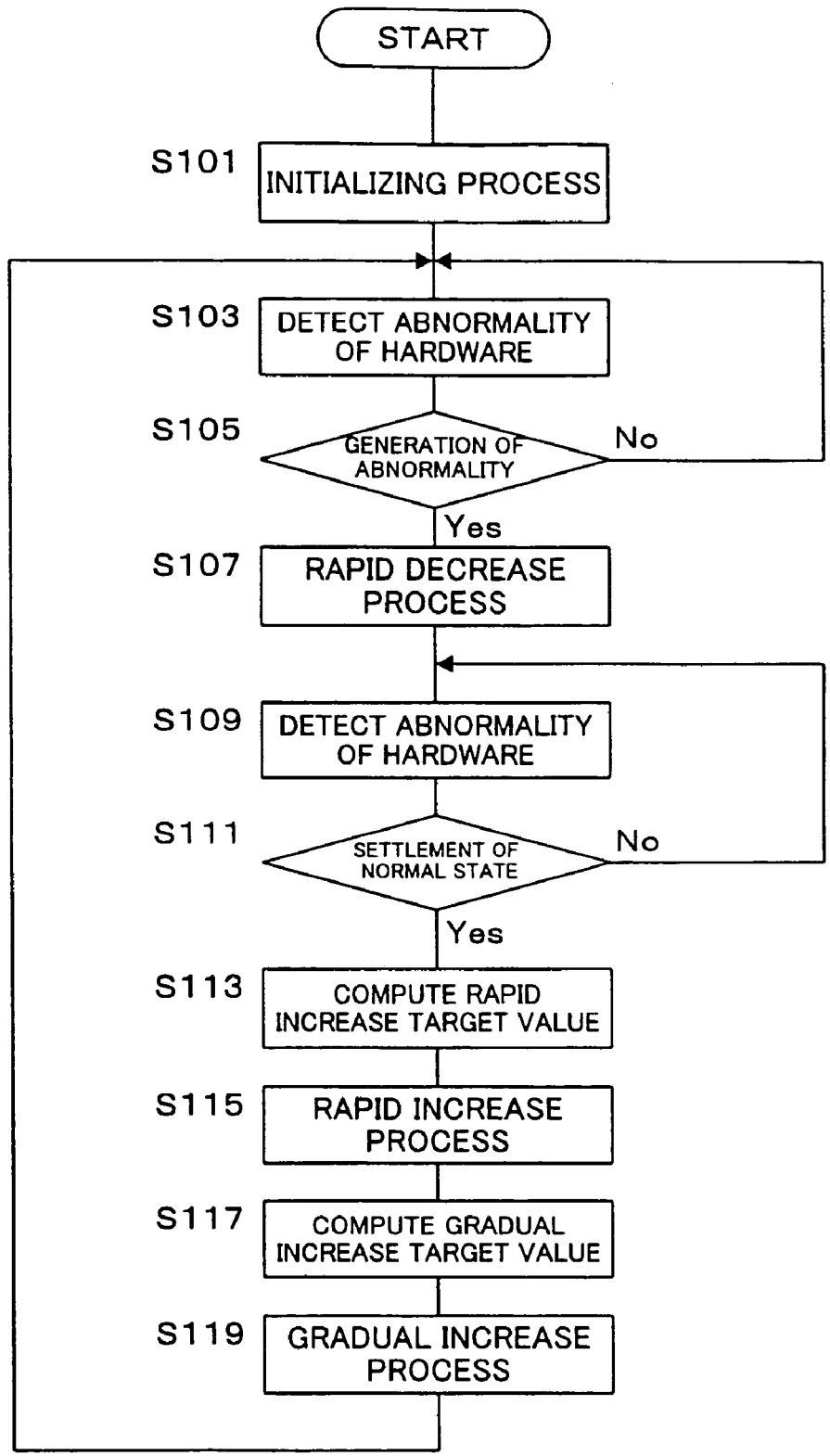
FIG. 3 is a flow chart showing a flow of an abnormal time resetting process executed by an MPU constituting the ECU of the electric power steering apparatus in accordance with the first embodiment.

In this case, a description will be given of an outline of a process of the abnormal time resetting process portion 30c by the ECU 30 on the basis of FIGS. 2 to 6. The abnormal time resetting process portion 30c is achieved, for example, by executing the abnormal time resetting process shown in FIG. 3 in succession during one trip by the MPU of the ECU 30. In this case, the abnormal time resetting process shown in FIG. 3 is achieved by executing an abnormal time resetting program stored in the memory of the MPU. Further, "one trip" means a period from a time when an ignition switch of the vehicle is turned on to a time when the ignition switch is turned off.

As shown in FIG. 3, in the abnormal time resetting process, an initializing process is first executed in accordance with a step S101. In other words, there are executed a self test of confirming whether or not an abnormality exists in the memory (DRAM, SRAM, register or the like) of the MPU, the input and output interface I/F or the like, and a process of setting a predetermined initial value to a control variable used for the abnormal time resetting process and a predetermined region secured as a working region in the memory. Accordingly, the variable gain Gv is set to "1".

In the next step S103, there is executed a process of detecting whether or not the abnormality is generated in the hardware such as the torque sensor 24 or the like. The process is executed, for example, by monitoring whether or not a data value of the steering torque Th input to the MPU from the torque sensor 24 is more than a predetermined range. Further, the data value input from each of the sensors such as the vehicle speed sensor, the current sensor 37 and the like is also monitored in the same manner. Further, the abnormality of the ECU 30 itself is determined, for example, by detecting whether or not the abnormality exists in the memory, the input and output interface I/F or the like on the basis of the result of the self test executed in the initializing process in accordance with the step S101. In this case, a subject of the abnormality detection in accordance with the step 103 is constituted by the hardware such as the torque sensor 24, the ECU 30, the motor rotation angle sensor 33, the motor drive circuit 35, the current sensor 37, the wire harness WH or the connector electrically connecting them, and the like, and they may correspond to "hardware" described in claims. Further, the step S103 may correspond to "abnormality detecting means" described in claims.

In a step S105, a process of determining whether or not the abnormality is generated is executed on the basis of the result of detecting the abnormality by the step S103. Further, in the case that the abnormality is generated (Yes in S105), the process is changed to a step S107, and in the case that the abnormality is not generated (No in S105), the process is changed to the step S103. Accordingly, in the case that the abnormality is not generated in the hardware such as the torque sensor 24 or the like (No in S105), the process of detecting whether or not the abnormality is generated in the hardware is executed again by the step S103.

Figure 4:
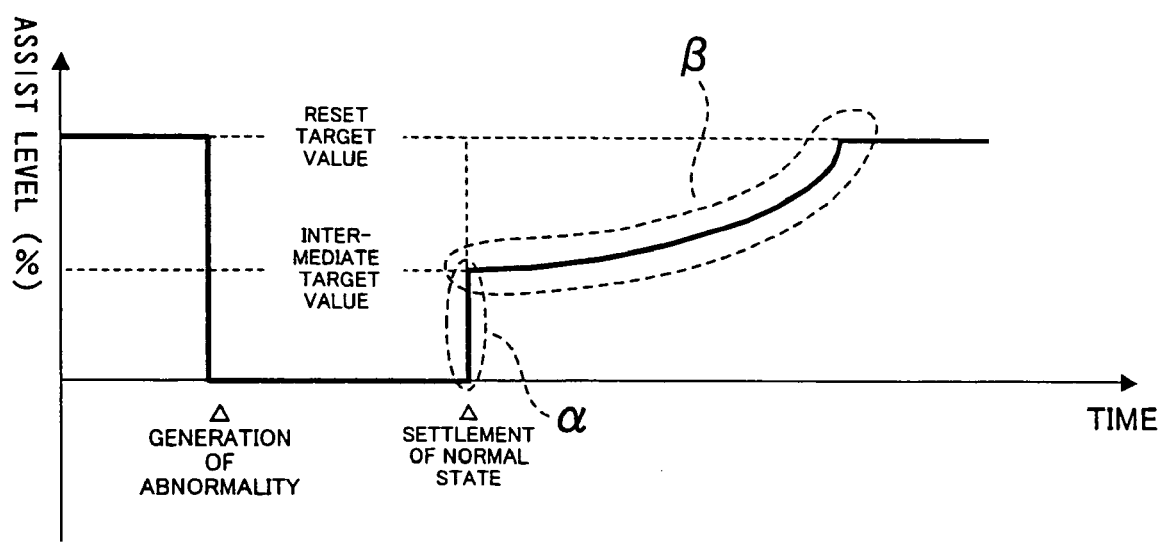
FIG. 4 is a characteristic view showing an example of an assist level obtained in accordance with the abnormal time resetting process shown in FIG. 3.

In the step S107, a rapid decreasing process is executed. In other words, there is executed a process of setting a decreasing target value to 0 (zero) or approximately 0 (approximately zero) by the variable gain and gradual increase target value computing portion 30c2 of the abnormal time resetting process portion 30c, and rapidly narrowing down the gain variable subsequent current command value iq'* output to the current control portion 30d until the gain variable subsequent current command value iq'* output from the abnormal time resetting process portion 30c reaches the rapid decreasing target value, by the decrease and increase process portion 30c1. Accordingly, since the motor current output to the motor M from the motor drive circuit 35 is exponentially decreased, an assist control can be executed as shown in FIG. 4 in such a manner that a level of an assist force (hereinafter, refer to as "assist level") by the motor M is immediately decreased after the abnormality of the hardware is generated. In this case, the step S107 and the decrease and increase process portion 30c1 may correspond to "abnormal time control means" described in claims.

In the next step S109, there is executed a process of detecting whether or not the abnormality is generated in the hardware such as the torque sensor 24 or the like. This process is approximately the same as the step S103 mentioned above, for example, since there is a possibility that the abnormality returns to the normal state, even if it is once determined by the step S103 that the abnormality is generated, by monitoring whether or not the data value of each of the sensors is more than the predetermined range, it is detected whether or not the abnormality exists. In this case, the step S109 may correspond to "abnormality detecting means" described in claims.

In other words, the abnormality of the hardware (the torque sensor 24, the ECU 30, the motor rotation angle sensor 33, the motor drive circuit 35, the current sensor 37, the wire harness WH electrically connecting them, the connector and the like) corresponding to the subject of the abnormality detection by the step S109 is not necessarily always generated, for example, in accordance with the condition of the vibration and the temperature and humidity change on the basis of the contact failure of the connector, the soldering failure of the circuit part or the like, and the abnormality is generated or not in accordance with the occasional condition. Further, the wire harness WH can repeat connection and disconnection at several times until the wire harness WH reaches a complete disconnection which can not conduct the sensor signal or the like from the nearly disconnection state. Accordingly, since there is a possibility that the respective states "abnormal state→normal state→abnormal state→normal state . . ." are repeated, for example, during a period of about some millisecond to some second, the structure is made such that the abnormality of the hardware is again detected by the present step S109.

In the subsequent step S111, there is executed a process of determining whether or not the normal state is settled. In other words, there is determined whether or not the hardware is returned to the normal state on the basis of with or without the abnormality of the hardware detected by the step S109. Further, if the state is returned to the normal state for a predetermined period or more, the settlement of the normal state is determined (Yes in S111), and the process is changed to the next step S113. On the other hand, in the case that the abnormal state is maintained and it is impossible to determine that the normal state is settled (No in S111), the step is changed to the step S109, and the abnormality of the hardware is again detected.

In the next step S113, there is executed a process of computing the rapid increase target value, and in a step S115, there is executed a rapid increase process. In other words, the increase target value is set to a previously determined intermediate target value (a predetermined intermediate value) by the variable gain and gradual increase target value computing portion 30c2 (S113), and there is executed a process of rapidly increasing the gain variable subsequent current command value iq'* output to the current control portion 30d until the gain variable subsequent current command value iq'* output by the abnormal time resetting process portion 30c reaches the intermediate target value by the decrease and increase process portion 30c1 (S115). Accordingly, since the motor current output to the motor M from the motor drive circuit 35 is exponentially increased, as shown in FIG. 4, the assist control can be executed in such a manner that the assist level of the motor M is immediately increased after the normal state of the hardware is settled (within a broken line α in the drawing). In this case, the steps S113 and 115, the decrease and increase process portion 30c1 and the variable gain and gradual increase target value computing portion 30c2 may correspond to "first resetting control means" described in claims.

In this case, the intermediate target value is set, for example, to approximately one half of a previously set basic assist current command value iqf* (a predetermined reset value) by multiplying the basic assist current command value iqf* by the variable gain Gv of 0.5. Accordingly, for example, it is possible to set the intermediate target value to such a comparatively low assist level as the so-called "the steering operation becomes suddenly ineffective" steering feeling in which the rotation of the steering wheel 21 which has been heavy until then becomes suddenly light is not applied to the driver.

In the succeeding step S117, there is executed a process of computing the gradual increase target value, and in a step S119, a gradual increasing process is executed. In other words, the increase target value is set to a previously determined reset target value (a predetermined reset value) by the variable gain and gradual increase target value computing portion 30c2 (S117), and there is executed a process of gradually increasing the gain variable subsequent current command value iq'* output to the current control portion 30d until the gain variable subsequent current command value iq'* output by the abnormal time resetting process portion 30c reaches the reset target value by the decrease and increase process portion 30c1 (S119). Accordingly, since the motor current output to the motor M from the motor drive circuit 35 is gradually increased, the assist control can be executed in such a manner that the assist level is gradually increased after the assist level is exponentially increased by the step S113 and the step S115, as shown in FIG. 4 (within a broken line β in the drawing). The reset target value corresponds, for example, to the basic assist current command value iqf* mentioned above. In this case, the steps S117 and 119, the decrease and increase process portion 30c1 and the variable gain and gradual increase target value computing portion 30c2 may correspond to "second resetting control means" described in claims.

In this case, since the assist level by the motor M is returned to the reset target value in the case that the gradual increase process by the step S119 is finished, it is possible to cope with the abnormality of the hardware which may be again generated, by again changing the process to the step S103.

As mentioned above, in accordance with the electric power steering apparatus 20 on the basis of the present embodiment, the process detects the abnormality of at least one of the hardwares including the motor M, the torque sensor 24, the ECU 30, the motor drive circuit 35 and the wire harness electrically connecting them respectively in accordance with the a normal time reset process executed by the MPU of the ECU 30 (S103), and in the case that the abnormality is detected (Yes in S105), the process controls the motor drive circuit 35 by the decrease and increase process portion 30c1, the current control portion 30d, and the PWM computing portion 30e in such a manner that the output of the assist force by the motor M is rapidly decreased (step S107). Further, in the case that the abnormality is not detected by the step S109 after detecting the abnormality of the hardware by the step S103 (Yes in S111), the process controls the motor drive circuit 35 by the decrease and increase process portion 30c1, the variable gain and gradual increase target value computing portion 30c2, the current control portion 30d and the PWM computing portion 30e in such a manner that the output of the assist force by the motor M is immediately increased to the intermediate target value (the predetermined intermediate value) (S113 and S115), and the process controls the motor drive circuit 35 by the decrease and increase process portion 30c1, the variable gain and gradual increase target value computing portion 30c2, the current control portion 30d and the PWM computing portion 30e in such a manner that the output of the assist force by the motor M is gradually increased to the reset target value (the predetermined reset value), after the output of the assist force by the motor M is increased to the immediate target value (S117 and S119).

Accordingly, in the case that the electric abnormality is once generated in the hardware such as the motor M, the torque sensor 24 or the like and the output of the assist force by the motor M is decreased, however, the electric abnormality is dissolved for some reason or other, the output of the assist force by the motor M is immediately increased to the intermediate target value (for example, such an assist force as the ineffective steering is not generated) (within the broken line α shown in FIG. 4). Accordingly, it is possible to prevent such a steering feeling as the steering wheel 21 becomes suddenly heavy from being applied. Further, since the output of the assist force is gradually increased to the reset target value (within the broken line β shown in FIG. 4) after the output of the assist force by the motor M is increased to the intermediate target value, it is possible to such a steering feeling as "sudden ineffective steering" in which the steering wheel 21 becomes suddenly light on the basis of the thereafter increase of the assist force even if the steering wheel 21 becomes heavy to some extent. Accordingly, since the assist can be smoothly changed from the assist at the abnormal time to the assist at the normal time while preventing the ineffective steering feeling, it is possible to improve the steering feeling.

In this case, a description will be given of a modified dint of the abnormal time reset process explained with reference to FIG. 3, on the basis of FIGS. 2, 5 and 6. In this case, since an abnormal time reset process (a modified embodiment) shown in FIG. 5 is constituted by adding additional processes (S202, S204, S206, S208 and S210) to the abnormal time reset process shown in FIG. 3, the same reference symbols are attached to substantially the same process contents as the abnormal time reset process shown in FIG. 3, and a description thereof will be omitted.

Figure 5:
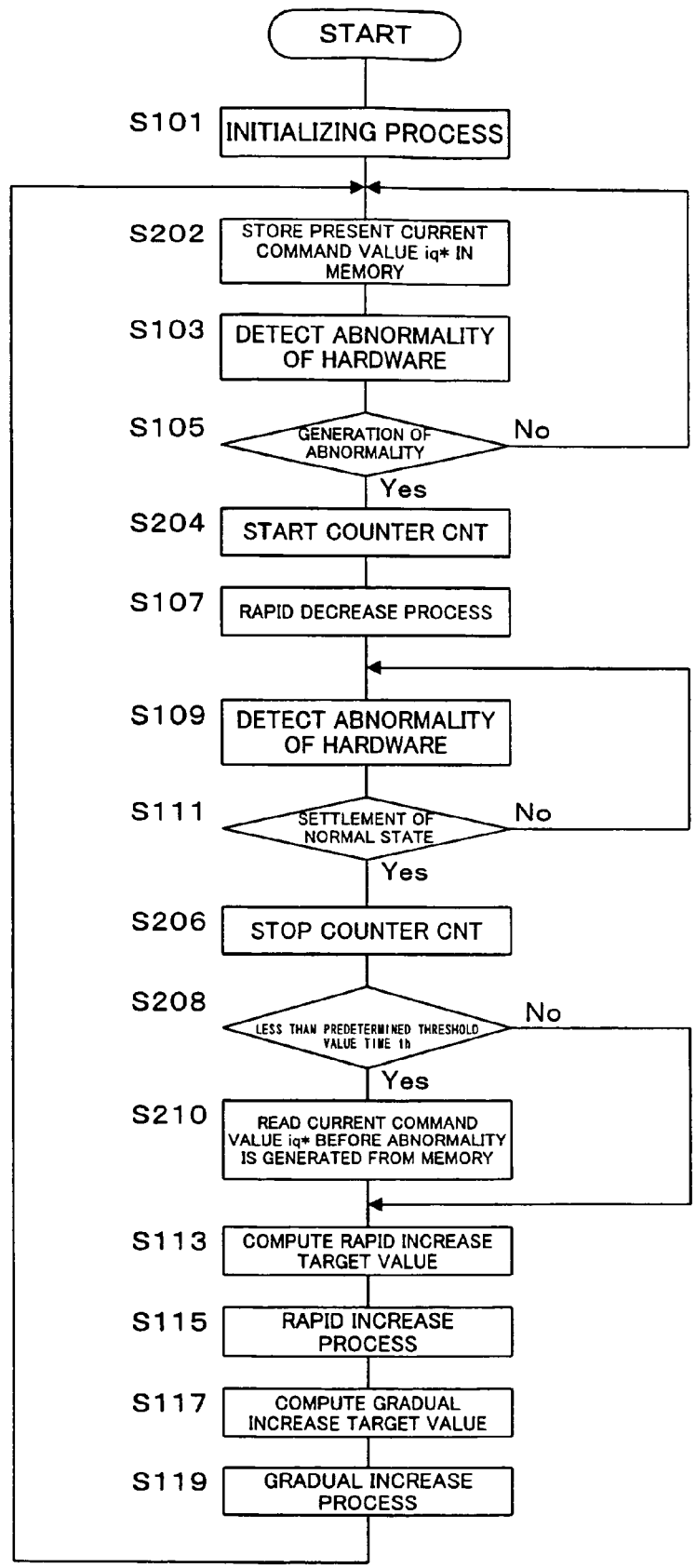
FIG. 5 is a flow chart showing a flow of a modified example of "abnormal time resetting process shown in FIG. 3"

As shown in FIG. 5, the abnormal time reset process in accordance with the present modified embodiment is achieved, in the same manner as that shown in FIG. 3, by being executed in succession during one trip by the MPU of the ECU 30, and is achieved by executing the other abnormal time reset program stored in the memory of the MPU. Further, since the abnormal time reset process in accordance with the present modified embodiment utilizes a function of a memory portion 30c3 shown in FIG. 2, in the initializing process by the step S101, there is executed an initializing process of clearing a predetermined region of the memory portion 30c3, zero clearing a counter CNT for clocking and the like.

After the initializing process by the step S101, a step S202 executes a process of storing the present current command value iq* in the memory. In other words, there is executed a process of storing the current command value iq* computed by the current camkind value computing portion 30b shown in FIG. 2 in the memory portion 30c3 (memory). Accordingly, it is possible to read the current command value iq* before the abnormality is generated from the memory portion 30c3 in accordance with a step S210 mentioned below. In this case, the step S202 and the memory portion 30c3 may correspond to "memory means" described in claims.

Further, when the process of determining whether or not the abnormality is generated is executed by the step S105, a process of starting the counter CNT is executed by a step S204 before the rapid decrease process by the step S107. The counter CNT is zero cleared in accordance with the initializing process (S101) mentioned above, and measures an abnormality duration t from a time when the abnormality of the hardware is detected by the step S103 to a time when the abnormality is not detected. In other words, the counter CNT is started by the present step S204 and is thereafter stopped by a step S206, whereby it is possible to measure the abnormality duration t during the time. Accordingly, for example, as shown in FIG. 6, it is possible to measure an abnormality duration t1 from a time when the abnormality is generated to a normal state settlement (1) and an abnormality duration t2 from the time when the abnormality is generated to a normal state settlement (2). In this case, the counter CNT and the steps S204 and S206 may correspond to "clocking means" described in claims.

The abnormality duration t measured in the manner mentioned above is determined in accordance with the process of determining whether or not the abnormality duration t is less than a predetermined threshold value time th by a step S208. In the case that it is less than the predetermined threshold value time th (Yes in S208), a process of reading the current command value iq* before the abnormality is generated by the succeeding step S210. Accordingly, since it is possible to acquire the current command value iq* stored in a memory portion 30c3 by the step S202 just before the abnormality of the hardware is generated, it is possible to set an intermediate target value Lv1' (a predetermined intermediate value) by the succeeding step S113 on the basis thereof. In this case, the predetermined threshold value time th is set, for example, to one second.

Figure 6:
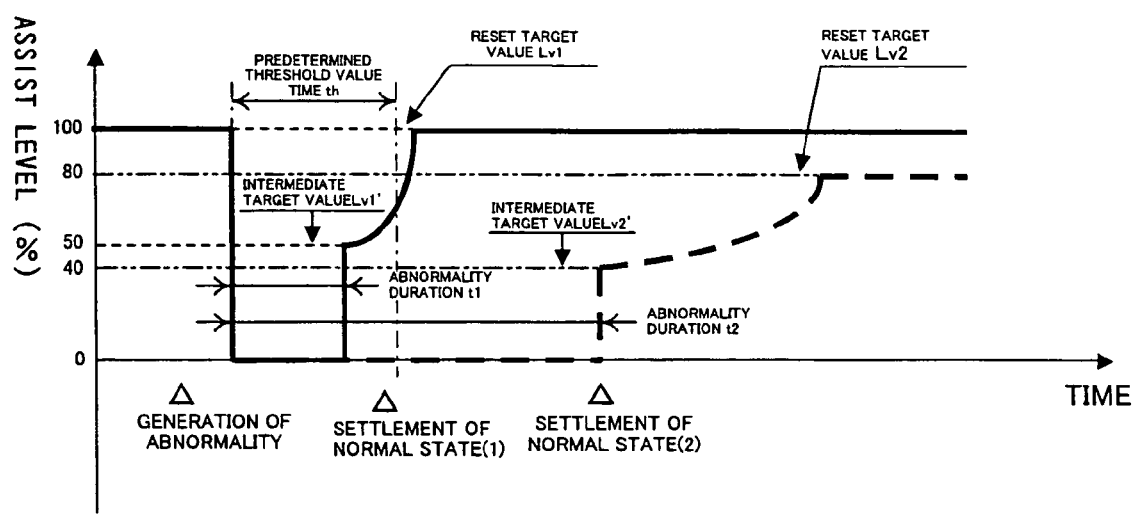
FIG. 6 is a characteristic view showing an example of an assist level obtained by the abnormal time resetting process (the modified example) shown in FIG. 5.

For example, as shown in FIG. 6, in the case that an assist level just before the abnormality is generated is 100% (a maximum assist level) (a thick solid line shown in FIG. 6), the current command value iq* corresponding to the assist level 100% is already stored in the memory portion 30c3 (the memory) (S202). Accordingly, it is possible to set the assist level 100% just before the abnormality is generated as a reset target value Lv1 by reading the current command value iq* before the abnormality is generated from the memory portion 30c3 (the memory) by the step S210 after the normality is settled (1) (step S117). Further, it is possible to set about 50% corresponding to approximately one half of the assist level 100% just before the abnormality is generated as the intermediate target value Lv1' (step S113).

Accordingly, in the case that the abnormality duration t1 is less than the predetermined threshold value time th (one second) (Yes in S208), if the abnormality is once generated in the hardware such as the motor M, the torque sensor 24 or the like, and the output of the assist force by the motor M is reduced, however, the abnormality is cancelled for some reason or other for one second thereafter, the assist force is immediately increased to approximately one half (about 50%) of the assist level just before the abnormality is generated, and is thereafter gradually increased to the assist level (100% in this case) just before the abnormality is generated. Therefore, even if the steering feeling that the steering wheel 21 becomes heavy to sane extent is temporarily applied to the driver, it is possible to thereafter apply the steering feeling just before detecting the electric abnormality to the driver. Accordingly, since it is possible to smoothly change to the assist just before the abnormality is generated, that is, the assist at the normal time, while preventing the steering ineffective feeling, it is possible to improve the steering feeling.

On the other hand, in the case that it is determined that the abnormality duration t is not less than the predetermined threshold value time th, that is, is equal to or more than the predetermined threshold value time th, in accordance with the determining process by the step S208 (No in S208), the process is changed to the step S113 while skipping the step S210. Therefore, for example, as shown by a thick broken line in FIG. 6, the previously set assist level 80% is set as a reset target value Lv2 (S117), and the assist level about 40% corresponding to approximately one half thereof is set as an intermediate target value Lv2' (S115).

In other words, as shown in FIG. 6, in the case that the abnormality duration t2 is equal to or more than the predetermined threshold value time th (one second) (No in S208) even if the assist level just before the abnormality is generated is 100% (a thick solid line shown in FIG. 6), the time equal to or more than one second has passed after the abnormality of the hardware is detected. There is a high possibility that the different steering from the steering just before the abnormality is generated is executed by the driver during the abnormality duration t2. Therefore, since it is possible to smoothly change to the assist at the normal time while preventing the steering ineffective feeling by gradually increasing to the previously set reset target value Lv2 after immediately increasing to the previously set intermediate target value Lv2' without relation to the current command value iq* before the abnormality is generated, it is possible to improve the steering feeling.

As mentioned above, in the abnormal time resetting process (the modified embodiment) shown in FIG. 5, the target value of the assist level by the motor M at a time of returning to the normal time is changed on the basis of the matter whether the time (the abnormality duration) required from the time when the abnormality is generated in the hardware to the time when the normal state is settled is less than the predetermined threshold value time th (Yes in the step S208) or not (NO in the step S208), by providing the concept of the predetermined threshold value time th.

Accordingly, in the case of resetting to the normal time for a short time (for example, one second or less) (Yes in the step S208), the target is returned to the assist level just before the abnormality is generated. Accordingly, it is possible to inhibit the uncomfortable feeling of the steering feeling applied to the driver. Further, in the case of returning to the normal time after a long time period (for example, one second or more) has passed (No in the step S208), the target is not returned to the assist level just before the abnormality is generated, but is returned to the previously set proper assist level. Therefore, it is possible to prevent the output of the improper assist force in accordance with the assist level some time ago. Accordingly, since it is possible to inhibit the uncomfortable feeling of the steering feeling applied to the driver, it is possible to further expect an improvement of the steering feeling.

In this case, in the first embodiment mentioned above, approximately one half of the reset target value corresponding to the predetermined reset value is set as the intermediate target value corresponding to the predetermined intermediate value, however, the present invention is not limited to this, but may appropriately set, for example, one third, two thirds, three fourths, or the like of the predetermined reset value, or 90%, 80%, 70% or the like of the predetermined reset value. Further, it is possible to calculate an average assist level in accordance with an algorithm capable of statistically analyzing a past traveling performance of the vehicle so as to set the average assist level as the predetermined reset value.

Second Embodiment

Figure 7:
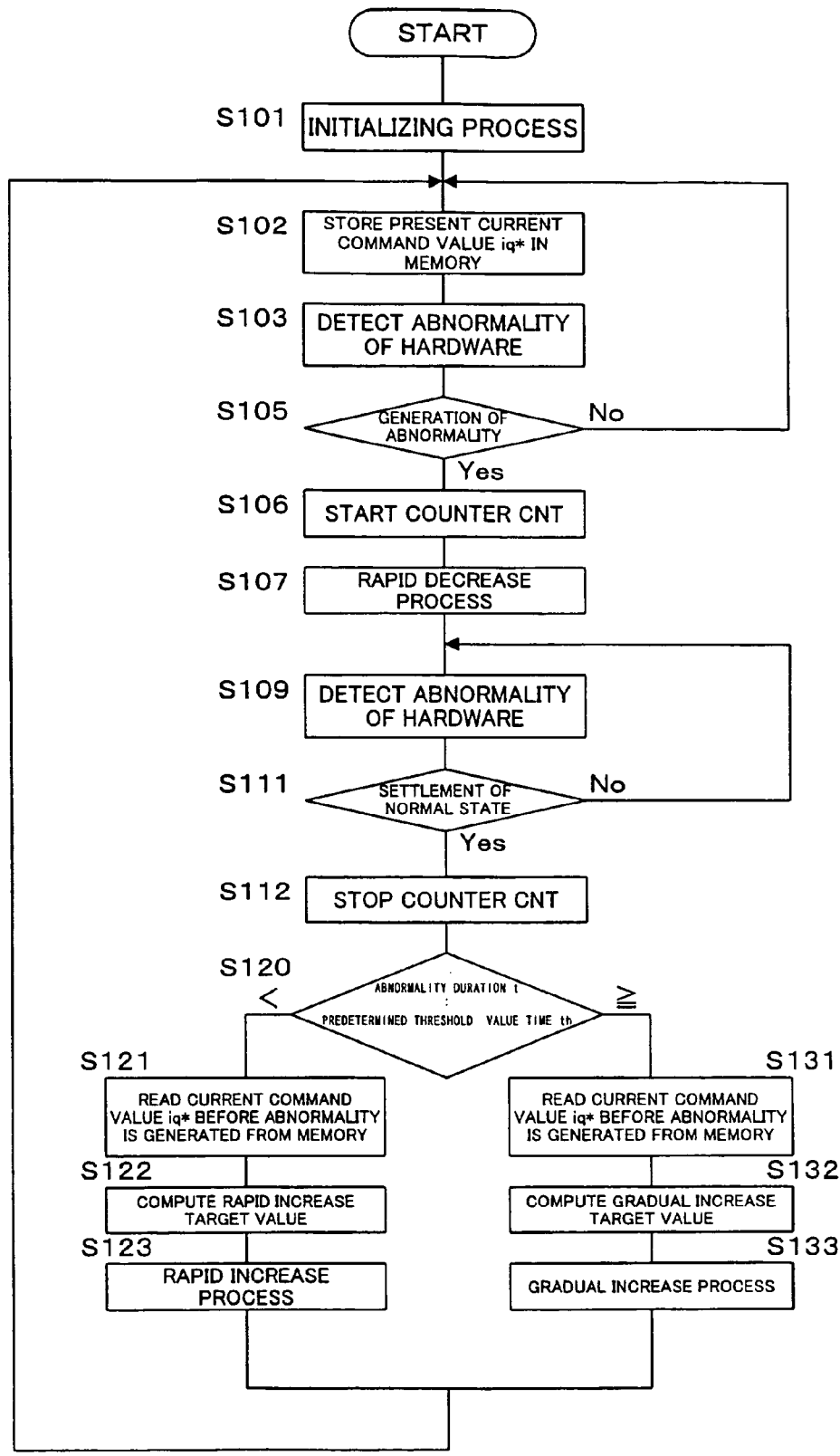
FIG. 7 is a flow chart showing a flow of an abnormal time resetting process executed by an MPU constituting an ECU of an electric power steering apparatus in accordance with a second embodiment.
Figure 8:
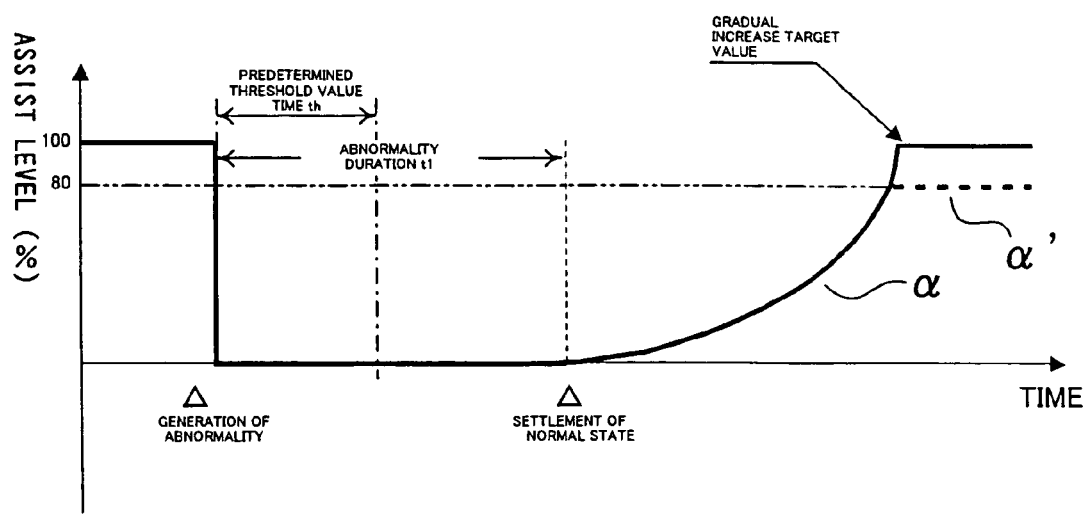
Figure 8:
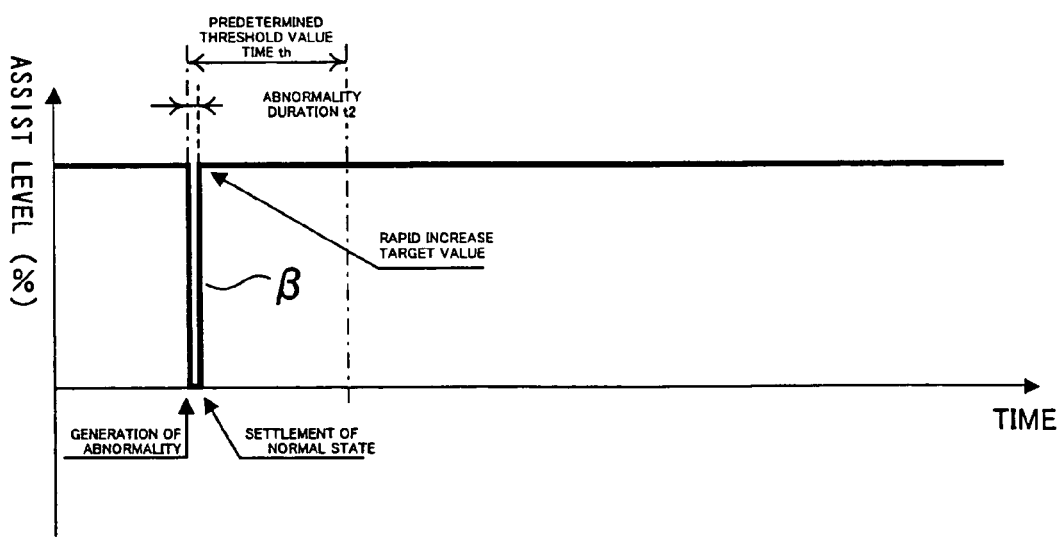

Continuously, a description will be given of an electric power steering apparatus in accordance with a second embodiment. A structure of the electric power steering apparatus in accordance with the second embodiment is the same as the first embodiment mentioned above with reference to FIGS. 1 and 2. In this case, only a process outline of the abnormal time resetting process portion 30c in FIG. 2 is different. Accordingly, a description will be given of the process outline of the abnormal time resetting process portion 30c by the ECU 30 of the electric power steering apparatus in accordance with the second embodiment on the basis of FIGS. 2 and 7 to 10. The abnormal time resetting process portion 30c is achieved by continuously executing the abnormal time resetting process, for example, shown in FIG. 7 during one trip by the MPU of the ECU 30. In this case, the abnormal time resetting process shown in FIG. 7 is achieved by executing the abnormal time resetting program stored in the memory of the MPU. Further, "one trip" means a period from a time when an ignition switch of the vehicle is turned on to a time when the ignition switch is turned off.

As shown in FIG. 7, in the abnormal time resetting process, an initializing process is first executed in accordance with a step S101. In other words, there are executed a self test of confirming whether or not an abnormality exists in the memory (DRAM, SRAM, register or the like) of the MPU, the input and output interface I/F or the like, and a process of setting a predetermined initial value to a control variable used for the abnormal time resetting process and a predetermined region secured as a working region in the memory. Accordingly, "0" (zero) is set to a value of the counter CNT, and the variable gain Gv is set to "1". The memory portion 30c3 corresponds to the memory 30c3 in the abnormal time resetting process portion 30c shown in FIG. 2.

In the next step S102, there is executed a process of storing the present current command value iq* in the memory. In other words, there is executed a process of storing the current command value iq* computed by the current command value computing portion 30b shown in FIG. 2 in the memory portion 30c3 (the memory). Accordingly, it is possible to read the current command value iq* before the abnormality is generated from the memory by the steps S121 and S131 mentioned below. In this case, the step S102 and the memory portion 30c3 may correspond to "memory means" described in claims.

In the succeeding step S103, there is executed a process of detecting whether or not the abnormality is generated in the hardware such as the torque sensor 24 or the like. The process is executed, for example, by monitoring whether or not a data value of the steering torque Th input to the MPU from the torque sensor 24 is more than a predetermined range. Further, the data value input from each of the sensors such as the vehicle speed sensor, the current sensor 37 and the like is also monitored in the same manner. Further, the abnormality of the ECU 30 itself is determined, for example, by detecting whether or not the abnormality exists in the memory, the input and output interface I/F or the like on the basis of the result of the self test executed in the initializing process in accordance with the step S101. In this case, a subject of the abnormality detection in accordance with the step 103 is constituted by the hardware such as the torque sensor 24, the ECU 30, the motor rotation angle sensor 33, the motor drive circuit 35, the current sensor 37, the wire harness WH or the connector electrically connecting them, and the like, and they may correspond to "hardware" described in claims. Further, the step S103 may correspond to "abnormality detecting means" described in claims.

In a step S105, a process of determining whether or not the abnormality is generated is executed on the basis of the result of detecting the abnormality by the step S103. Further, in the case that the abnormality is generated (Yes in S105), the process is changed to a step S106, and in the case that the abnormality is not generated (No in S105), the process is changed to the step S102. Accordingly, in the case that the abnormality is not generated in the hardware such as the torque sensor 24 or the like (No in S105), the process of detecting whether or not the abnormality is generated in the hardware is executed again by the step S103.

In a step S106, a process of starting the counter CNT is executed. The counter CNT is started by the present step, and is thereafter stopped by the step S112, whereby it is possible to measure a time during the period, that is, the abnormality duration t. Accordingly, it is possible to measure, for example, an abnormality duration t1 from a time when the abnormality is generated to a time when the normality is settled as shown in FIG. 8A, and an abnormality duration t2 from a time when the abnormality is generated to a time when the normality is settled as shown in FIG. 8B. In this case, the counter CNT and the steps S106 and S112 may correspond to "clocking means" described in claims.

In the step S107, a rapid decreasing process is executed. In other words, there is executed a process of setting a decreasing target value to 0 (zero) or approximately 0 (approximately zero) by the variable gain and gradual increase target value computing portion 30c2 of the abnormal time resetting process portion 30c, and rapidly narrowing down the gain variable subsequent current command value iq'* output to the current control portion 30d until the gain variable subsequent current command value iq'* output from the abnormal time resetting process portion 30c reaches the rapid decreasing target value, by the decrease and increase process portion 30c1. Accordingly, since the motor current output to the motor M from the motor drive circuit 35 is exponentially decreased, an assist control can be executed as shown in FIGS. 8A and 8B in such a manner that a level of an assist force (hereinafter, refer to as "assist level") by the motor M is immediately decreased after the abnormality of the hardware is generated. In this case, the step S107 and the decrease and increase process portion 30c1 may correspond to "abnormal time control means" described in claims.

In the next step S109, there is executed a process of detecting whether or not the abnormality is generated in the hardware such as the torque sensor 24 or the like. This process is approximately the same as the step S103 mentioned above, for example, since there is a possibility that the abnormality returns to the normal state, even if it is once determined by the step S103 that the abnormality is generated, by monitoring whether or not the data value of each of the sensors is more than the predetermined range, it is detected whether or not the abnormality exists. In this case, the step S109 may correspond to "abnormality detecting means" described in claims.

In other words, the abnormality of the hardware (the torque sensor 24, the ECU 30, the motor rotation angle sensor 33, the motor drive circuit 35, the current sensor 37, the wire harness WH electrically connecting them, the connector and the like) corresponding to the subject of the abnormality detection by the step S109 is not necessarily always generated, for example, in accordance with the condition of the vibration and the temperature and humidity change on the basis of the contact failure of the connector, the soldering failure of the circuit part or the like, and the abnormality is generated or not in accordance with the occasional condition. Further, the wire harness WH can repeat connection and disconnection at several times until the wire harness WH reaches a complete disconnection which can not conduct the sensor signal or the like from the nearly disconnection state. Accordingly, since there is a possibility that the respective states "abnormal state→normal state→abnormal state→normal state . . . " are repeated, for example, during a period of about some milliseconds to some seconds, the structure is made such that the abnormality of the hardware is again detected by the present step S109.

In the subsequent step S111, there is executed a process of determining whether or not the normal state is settled. In other words, there is determined whether or not the hardware is returned to the normal state on the basis of with or without the abnormality of the hardware detected by the step S109. Further, if the state is returned to the normal state for a predetermined period or more, the settlement of the normal state is determined (Yes in S111), and the process is changed to the next step S112. On the other hand, in the case that the abnormal state is maintained and it is impossible to determine that the normal state is settled (No in S111), the step is changed to the step S109, and the abnormality of the hardware is again detected.

In the step S112, there is executed a process of stopping the counter CNT started by the step S106. The abnormality duration t, that is, a time which has passed from a time when the electric abnormality of the hardware such as the torque sensor 24 or the like is detected to a time when the electric abnormality is not detected is obtained on the basis of the value of the counter CNT.

In the succeeding step S120, there is executed a process of determining a relation between the abnormality duration t obtained by the step S112 and the previously set predetermined threshold value time th. In other words, the step determines whether the abnormality duration t is less than the predetermined threshold value time th ("<" in S120) or the abnormality duration t is equal to or more than the predetermined threshold value time th ("≧" in S120). Further, in the case that the abnormality duration t is less than the predetermined threshold value time th ("<" in S120), the process is changed to a step S121, and in the case that the abnormality duration t is equal to or more than the predetermined threshold value time th ("≧" in S120), the process is changed to a step S131. In this case, the predetermined threshold value time th is set, for example, to one second. Further, the predetermined threshold value time th may correspond to "predetermined time" described in claims.

The steps S121 to S123 correspond to the process executed in the case that the abnormality duration t is less than the predetermined threshold value time th, and there is executed a process of immediately increasing the output of the assist force by the motor M to the reset target value (the predetermined reset value). Accordingly, for example, as shown in FIG. 8B, in the case that the abnormality duration t2 is extremely short (for example, for some milliseconds), the output of the assist force by the motor M is exponentially increased to the reset target value. Accordingly, it is possible to prevent such a steering feeling as the steering wheel 21 becomes suddenly heavy from being applied.

First, the step S121 executes a process of reading the current command value iq* before the abnormality is generated from the memory. In other words, since the current command value iq* at a time of the normal time just before the abnormality is detected in the hardware is stored in the memory portion 30c3 (the memory) by the step S102, the process of reading it from the memory is executed.

Next, a process of computing the rapid increase target value is executed by the step S122, and a rapid increase process is executed by the step S123. In other words, the assist level just before the abnormality is generated is set as the rapid increase target value (the predetermined reset value) by the variable gain and gradual increase target value computing portion 30c2 on the basis of the current command value iq* before the abnormality is generated read from the memory portion 30c3 (the memory) (step S122), and there is executed a process of immediately increasing the gain variable subsequent current sand value iq' * output to the current control portion 30d until the gain variable subsequent current command value iq' * output by the abnormal time resetting process portion 30c reaches the rapid increase target value by the decrease and increase process portion 30c1 (S123). Accordingly, since the motor current output to the motor M from the motor drive circuit 35 is exponentially increased, a characteristic shown in FIG. 8B is obtained (reference symbol β in FIG. 8B).

On the other hand, steps S131 to S133 correspond to a process executed in the case that the abnormality duration t is equal to or more than the predetermined threshold value time th, and there is executed a process of gradually increasing the output of the assist force by the motor M to the reset target value (the predetermined reset value). Accordingly, for example, as shown in FIG. 8A, in the case that the abnormality duration t1 is extremely long (for example, for some seconds), the output of the assist force by the motor M is slowly increased to the reset target value. Accordingly, even if the steering wheel 21 becomes heavy to some extent, it is possible to prevent such a steering feeling as the rotation of the steering wheel 21 becomes suddenly light due to the slow increase of the subsequent assist force, that is, "steering becomes suddenly ineffective", from being applied.

First, the step S131 executes a process of reading the current command value iq* before the abnormality is generated from the memory. The process reads the current command value iq* at a time of the normal time just before the abnormality is detected in the hardware stored in the memory portion 30c3 in the same manner as the step S121 mentioned above.

Next, a process of computing the gradual increase target value is executed by the step S132, and a gradual increase process is executed by the step S133. In other words, the assist level just before the abnormality is generated is set as the gradual increase target value (the predetermined reset value) by the variable gain and gradual increase target value computing portion 30c2 on the basis of the current command value iq* before the abnormality is generated read from the memory portion 30c3 (the memory) (step S132), and there is executed a process of gradually increasing the gain variable subsequent current command value iq'* output to the current control portion 30d until the gain variable subsequent current command value iq'* output by the abnormal time resetting process portion 30c reaches the gradual increase target value by the decrease and increase process portion 30c1 (S123). Accordingly, since the motor current output to the motor M from the motor drive circuit 35 is slowly increased, a characteristic shown in FIG. 8A is obtained (reference symbol α in FIG. 8A).

In this case, the steps S121, S122, S123, S131, S132 and S133, the decrease and increase process portion 30c1 and the variable gain and gradual increase target value computing portion 30c2 may correspond to "reset time control means" described in claim 4.

As mentioned above, in accordance with the electric power steering apparatus 20 on the basis of the present embodiment, the process detects the abnormality of at least one of the hardwares including the motor M, the torque sensor 24, the ECU 30, the motor drive circuit 35 and the wire harness electrically connecting them respectively in accordance with the abnormal time reset process executed by the MPU of the ECU 30 (S103), and in the case that the abnormality is detected (Yes in S105), the process controls the motor drive circuit 35 by the decrease and increase process portion 30c1, the current control portion 30d, and the PWM computing portion 30e in such a manner that the output of the assist force by the motor M is rapidly decreased (step S107). Further, in the case that the abnormality is not detected by the step S109 after detecting the abnormality of the hardware by the step S103 (Yes in S111), when the abnormality duration t measured by the counter CNT (the steps S106 and S112) is less than the predetermined threshold value time th ("<" in S120), the process controls the motor drive circuit 35 by the decrease and increase process portion 30c1, the variable gain and gradual increase target value computing portion 30c2, the current control portion 30d and the PWM computing portion 30e in such a manner that the output of the assist force by the motor M is immediately increased to the rapid increase target value (the predetermined reset value) (S121 to S123), and when the abnormality duration t is equal to or more than the predetermined threshold value time th, the process controls the motor drive circuit 35 by the decrease and increase process portion 30c1, the variable gain and gradual increase target value computing portion 30c2, the current control portion 30d and the PWM computing portion 30e in such a manner that the output of the assist force by the motor M is gradually increased to the gradual increase target value (the predetermined reset value) (S131 to S133).

Accordingly, in the case that the electric abnormality is once generated in the hardware such as the motor M, the torque sensor 24 or the like and the output of the assist force by the motor M is decreased, however, the electric abnormality is dissolved for some reason or other, and the abnormality duration t during the period is less than the predetermined threshold value time th, the output of the assist force by the motor M is immediately increased to the rapid increase target value. Accordingly, it is possible to prevent such a steering feeling as the steering wheel 21 becomes suddenly heavy from being applied. On the other hand, in the case that the abnormality duration t is equal to or more than the predetermined threshold value time th, the output of the assist force by the motor M is gradually increased to the gradual increase target value. Accordingly, it is possible to such a steering feeling as the rotation of the steering wheel 21 becomes suddenly light, that is, "steering becomes suddenly ineffective", on the basis of the thereafter slow increase of the assist force even if the steering wheel 21 becomes heavy to some extent. Accordingly, since it is possible to determine whether the rapid increase or the gradual increase of the assist force in correspondence to the length of the abnormality duration t, it is possible to improve the steering feeling.

Further, the electric power steering apparatus 20 in accordance with the second embodiment is provided with the memory portion 30c3 which can store the current command value iq* of the motor M, and stores the current command value iq* just before the abnormality is detected (S102). Further, since the process reads the current demand value iq* just before the abnormality is detected stored in the memory portion 30c3 after the abnormality is generated (S121), and set the assist level just before the abnormality is generated as the rapid increase target value by the variable gain and gradual increase target value computing portion 30c2 on the basis thereof (step S122), it is possible to apply the steering feeling just before the abnormality is detected to the driver. Accordingly, it is possible to further improve the steering feeling.

In this case, in a flow chart shown in FIG. 7, the gradual increase target value (the predetermined reset value) is set on the basis of the current command value iq* before the abnormality is generated read by the step S131 (step S132), as the process executed in the case that the abnormality duration t is equal to or more than the predetermined threshold value time th, however, the process is not limited to this, but, the previously determined reset target value (the predetermined reset value) may be set by the step S132, for example, 80% of the maximum assist level, without relation to the current command value iq* before the abnormality is generated, for example, by deleting the step S131. For example, in the case that one second or more time has passed after the abnormality of the hardware is detected, there is a high possibility that the different steering operation from that just before the abnormality is generated is executed by the driver during the abnormality duration t1. Accordingly, even in the case that it is possible to gradually increase to the previously set reset target value without relation to the current command value iq* before the abnormality is generated as mentioned above (reference symbol α' shown in FIG. 8A), it is possible to improve the steering feeling.

Figure 9:
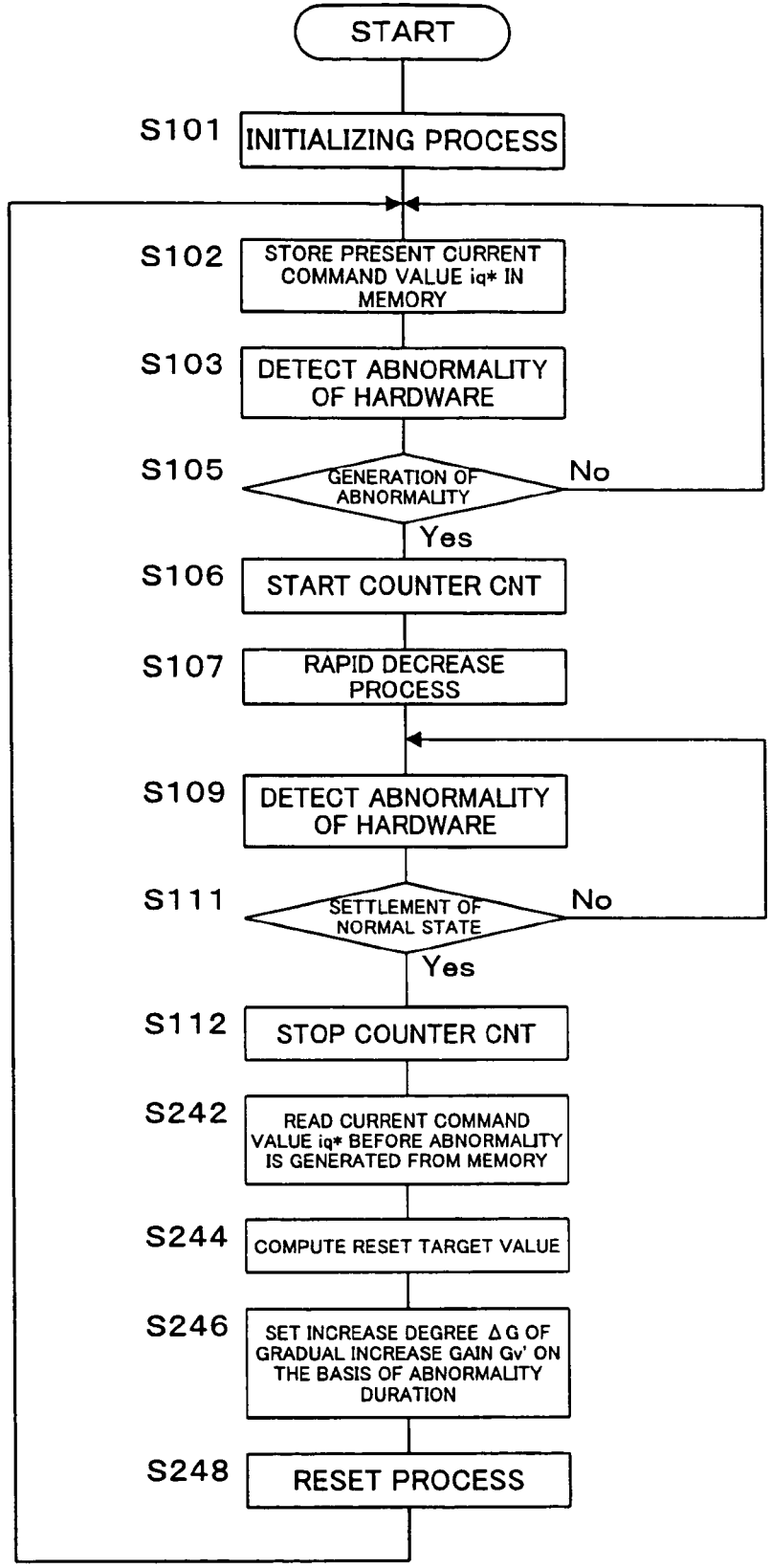
FIG. 9 is a flow chart showing a flow of a modified example of "abnormal time resetting process shown in FIG. 7"
Figure 10:
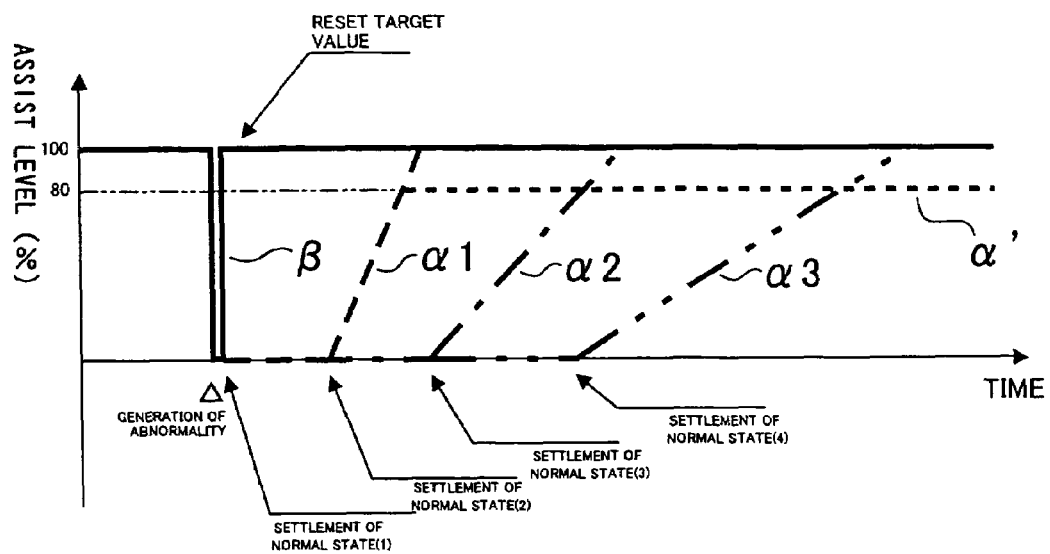
FIG. 10A is a characteristic view showing an example of an assist level obtained by the abnormal time resetting process (the modified example) shown in FIG. 9.
FIG. 10B is a characteristic view showing a state of a time fluctuation of a gradually increasing gain Gv'.
Figure 10:
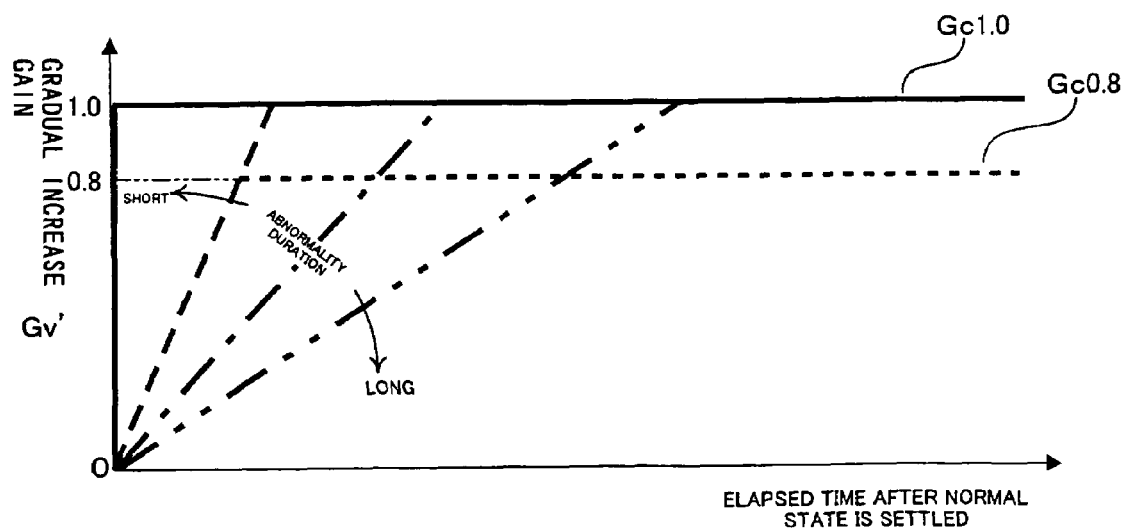

In this case, a description will be given of a modified embodiment of the abnormal time resetting process which was described with reference to FIG. 7, on the basis of FIGS. 2, 9 and 10. In this case, the abnormal time resetting process (the modified embodiment) shown in FIG. 9 is structured by replacing the steps after the step S120 of the abnormal time resetting process shown in FIG. 7 by steps S242, S244, S246 and S248. Accordingly, the same reference symbols are attached to substantially the same process contents as those of the abnormal time resetting process shown in FIG. 7, and a description thereof will be omitted.

As shown in FIG. 9, the abnormal time reset process in accordance with the present modified embodiment is achieved, in the same manner as that shown in FIG. 7, by being executed in succession during one trip by the MPU of the ECU 30, and is achieved by executing the other abnormal time reset program stored in the memory of the MPU. Since the steps S101 to S112 are executed in the same manner as the abnormal time reset process shown in FIG. 7, a description will be given of a process after stopping the counter CNT by the step S112.

As shown in FIG. 9, in the step S242 following to the step S112, there is executed a process of reading the current command value iq* before the abnormality is generated from the memory. This process reads the current command value iq* at the normal time just before detecting the abnormality of the hardware stored in the memory portion 30c3 in the same manner as the step S121 and the step S131 shown in FIG. 7.

In the succeeding step S244, a process of computing the reset target value is executed. In other words, there is executed a process of setting the assist level just before the abnormality is generated as the reset target value (the predetermined reset value) by the variable gain and gradual increase target value computing portion 30c2, on the basis of the current command value iq* before the abnormality is generated read from the memory portion 30c3 (the memory) by the step S242. Accordingly, for example, as shown in FIG. 10A, it is possible to reset to the assist level (for example, 100%) just before the abnormality is generated.

In this case, in place of setting the reset target value on the basis of the current command value iq* before the abnormality is generated as mentioned above, for example, the other previously determined reset target value (the predetermined reset value) may be set in accordance with a step S244. For example, in the case that, for example, one second or more time has passed after the abnormality of the hardware is detected, there is a high possibility that the different steering operation form that just before the abnormality is generated is executed by the driver during the abnormality duration t1. Accordingly, in the case that the abnormality duration t1 is equal to or more than one second on the basis of the length of the abnormality duration t, it is possible to employ such an algorithm of setting the other reset target value (for example, an assist level of 80% of a reference symbol α' shown in FIG. 10A) without relation to the current command value iq* before the abnormality is generated as mentioned above. Accordingly, it is possible to improve the steering feeling.

In the next step S246, there is executed a process of setting an increase degree ΔG of a gradual increase gain Gv' on the basis of the abnormality duration t. In other words, as shown in FIG. 10B, the gradual increase gain Gv' has a characteristic of increasing to a predetermined fixed gain Gc (for example, a gain 1.0 (Gc1.0 shown in FIG. 10B) by a time constant Tg together with a passage of time from the settlement of the normal operation. Accordingly, the increase degree ΔG is set in such a manner that the shorter the abnormality duration t is, the larger the increase degree ΔG of the gradual increase gain Gv' is, and the longer the abnormality duration t is, the smaller the increase degree ΔG of the gradual increase gain Gv' is, or the time constant Tg is set in such a manner that the shorter the abnormality duration t is, the shorter the time constant Tg of the gradual increase gain Gv' is, and the longer the abnormality duration t is, the larger the time constant Tg of the gradual increase gain Gv' is.

In this case, the increase degree ΔG expresses a percentage increase of the gradual increase gain Gv' per unit of time, and means a slope expressing an increase of the gradual increase gain Gv' after the normal operation is settled. Further, the time constant Tg means a time required until the gradual increase gain Gv' reaches the predetermined fixed gain Gc, the smaller the time constant Tg is, the larger the increase degree ΔG of the gradual increase gain Gv' is, and the larger the time constant Tg is, the smaller the increase degree ΔG of the gradual increase gain Gv' is.

In the embodiment shown in FIG. 10B, the gradual gain shown by a solid line has the largest increase degree ΔG (the smallest time constant Tg), the increase degree ΔG is reduced (the time constant Tg is increased) in the order of "gradual gain shown by a broken line" and "gradual gain shown by a single-dot chain line", and "gradual gain shown by a two-dot chain line" has the smallest increase degree ΔG (the largest time constant Tg). In this case, "gradual gain shown by a dotted line" shown in FIG. 10B (a predetermined fixed gain Gc0.8) is an upper limit value gain 0.8 of the gradual increase gain Gv' used in the case of setting the other reset target value without relation to the current command value iq* before the abnormality is generated mentioned above.

In the step S248, there is executed a reset process of increasing the assist level to the gradual increase target value on the basis of the increase degree ΔG of the gradual increase gain Gv' or the time constant Tg set by the step S246. For example, in the case that the time from the time when the abnormality is generated to the time when the normal operation is settled is comparatively short one millisecond (for example, a normal settlement (1) shown in FIG. 10A) such as the characteristic of a solid line shown in FIG. 10A, the increase degree ΔG of the gradual increase gain Gv' or the time constant Tg is set to be extremely large or be extremely small in the time constant Tg by the step S246, as shown in FIG. 10B. Accordingly, the output of the assist force by the motor M is exponentially increased to the reset target value (a characteristic by a solid Line β shown in FIG. 10A).

On the contrary, in the case that the time from the time when the abnormality is generated to the time when the normal operation is settled is comparatively long some seconds (for example, a normal settlement (4) shown in FIG. 10A), the increase degree ΔG of the gradual increase gain Gv' or the time constant Tg is set to be small or be large in the time constant Tg by the step S246, such as a two-dot chain line shown in FIG. 10B. Accordingly, the output of the assist force by the motor M is gradually increased to the reset target value (a characteristic by a two-dot chain line α3 shown in FIG. 10A).

Further, in the case that the time from the time when the abnormality is generated to the time when the normal operation is settled is intermediate therebetween (for example, one second of a normal settlement (2) and two seconds of a normal settlement (3) shown in FIG. 10A), the increase degree ΔG of the gradual increase gain Gv' or the time constant Tg is set to be intermediate between the solid line and the two-dot chain line, such as a characteristic of a broken line or a single-dot chain line shown in FIG. 10B. Accordingly, the output of the assist force by the motor M is increased to the reset target value at a rate in accordance with them (a characteristic by a broken line α1 or a characteristic by a single-dot chain line α2 shown in FIG. 10A).

In this case, the steps S242, S244, S246 and S248, the decease and increase process portion 30c1 and the variable gain and gradual increase target value computing portion 30c2 may correspond to "reset time control means" described in claim 6.

As mentioned above, in the abnormal time reset process (the modified embodiment) shown in FIG. 9, the concept called as the gradual increase gain Gv' in which the gain is increased in accordance with the elapsed time after the normal operation is settled is provided, and the increase degree ΔG of the gradual increase gain Gv' or the time constant Tg is set on the basis of the time (the abnormality duration t) required from the time when the abnormality is generated in the hardware to the time when the normal state is settled (S246). Accordingly, since it is possible to optionally change the time required until the assist level by the motor M reaches the gradual increase target time (the predetermined reset time), for example, since the output of the assist force by the motor M is exponentially increased to the gradual increase target value (the predetermined reset value) in the case that the abnormality duration t is extremely short (for example, some milliseconds), it is possible to prevent such a steering feeling as the steering wheel 21 becomes suddenly heavy from being applied. On the other hand, in the case that the abnormality duration t is extremely long (for example, some seconds), the output of the assist force by the motor M is slowly increased to the gradual increase target value (the predetermined reset value), it is possible to prevent such a steering feeling as the rotation of the steering wheel 21 becomes suddenly light on the basis of the thereafter slow increase of the assist force, that is, "steering operation becomes suddenly ineffective" from being applied, even if the steering wheel 21 becomes heavy to some extent. Accordingly, since it is possible to determine whether the rapid increase or the gradual increase of the assist force in accordance with the length of the abnormality duration t, it is possible to improve the steering feeling.

In this case, in the embodiment mentioned above, as shown in FIG. 1, the description is given by exemplifying the so-called column type electric power steering apparatus 20 which can transmit the assist force output from the motor M to the pinion input shaft 23 via the speed reduction gear 27, as shown in FIG. 1. However, the present invention is not limited to this, for example, the present invention may be applied to a so-called rack type electric power steering apparatus in which the motor M and the speed reduction gear 27 are installed in the rack and pinion 28, and the assist force output from the motor M can be transmitted to the rack mechanism via the speed reduction gear 27, and even in the rack type electric power steering apparatus, it is possible to obtain the same operations and effects as those of the electric power steering apparatus 20 mentioned above. Further, the motor M may be constituted by a brushless DC motor.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. An electric power steering apparatus comprising:
   a motor outputting an assist force capable of assisting a steering operation by a steering wheel;
   a torque sensor detecting a steering torque by said steering wheel;
   a computing means for computing a current command value of said motor on the basis of said steering torque; and
   a control means for controlling a generation of the assist force by said motor on the basis of said current command value,
   wherein the electric power steering apparatus comprises:
   an abnormality detecting means for detecting an electric abnormality of at least one of hardwares including said motor, said torque sensor, said computing means, said control means and connecting means for electrically connecting them respectively;
   an abnormal time control means for controlling said control means in such a manner that an output of the assist force by said motor is reduced in the case that the electric abnormality of said hardware is detected by said abnormality detecting means;
   a first resetting control means for controlling said control means in such a manner that the output of the assist force by said motor is immediately increased to a predetermined intermediate value in the case that said electric abnormality is not detected by said abnormality detecting means after detecting the electric abnormality of said hardware by said abnormality detecting means; and
   a second resetting control means for controlling said control means in such a manner that the output of the assist force by said motor is gradually increased to a predetermined reset value after the output of the assist force by said motor is increased to said predetermined intermediate value by said first resetting control means.

2. An electric power steering apparatus as claimed in claim 1, further comprising:
   a memory means for storing the current command value of said motor; and
   a clocking means for measuring an abnormality duration from a time when the electric abnormality of said hardware is detected by said abnormality detecting means to a time when said electric abnormality is not detected,
   wherein in the case that said abnormality duration is less than a predetermined time, said predetermined reset value is constituted by the assist force by said motor output on the basis of said current command value stored in said memory means just before said electric abnormality is detected, and said predetermined intermediate value is approximately one half of said predetermined reset value.

3. An electric power steering, apparatus as claimed in claim 1, further comprising:
   a clocking means for measuring an abnormality duration from a time when the electric abnormality of said hardware is detected by said abnormality detecting means to a time when said electric abnormality is not detected,
   wherein in the case that said abnormality duration is equal to or more than a predetermined time, said predetermined reset value is constituted by a previously set predetermined assist force, and said predetermined intermediate value is approximately one half of said predetermined reset value.

4. An electric power steering apparatus as claimed in claim 2, further comprising:

a clocking means for measuring an abnormality duration from a time when the electric abnormality of said hardware is detected by said abnormality detecting means to a time when said electric abnormality is not detected, wherein in the case that said abnormality duration is equal to or more than a predetermined time, said predetermined reset value is constituted by a previously set predetermined assist force, and said predetermined intermediate value is approximately one half of said predetermined reset value.

5. An electric power steering apparatus comprising:

a motor outputting an assist force capable of assisting a steering operation by a steering wheel;

a torque sensor detecting a steering torque by said steering wheel;

a computing means for computing a current command value of said motor on the basis of said steering torque; and a control means for controlling a generation of the assist force by said motor on the basis of said current command value, wherein the electric power steering apparatus comprises:

an abnormality detecting means for detecting an electric abnormality of at least one of hardwares including said motor, said torque sensor, said computing means, said control means and connecting means for electrically connecting them respectively;

an abnormal time control means for controlling said control means in such a manner that an output of the assist force by said motor is reduced in the case that the electric abnormality of said hardware is detected by said abnormality detecting means;

a clocking means for measuring an abnormality duration from a time when the electric abnormality of said hardware is detected by said abnormality detecting means to a time when said electric abnormality is not detected, and a reset time control means for controlling said control means in such a manner that the output of the assist force by said motor is immediately increased to a predetermined reset value if said abnormality duration is less than a predetermined time, in the case that said electric abnormality is not detected by said abnormality detecting means after detecting the electric abnormality of said hardware by said abnormality detecting means, and in such a manner that the output of the assist force by said motor is gradually increased to a predetermined reset value if said abnormality duration is equal to or more than the predetermined time.

6. An electric power steering apparatus as claimed in claim 5, further comprising a memory means for storing the current command value of said motor, wherein in the case that said abnormality duration is less than a predetermined time, said predetermined reset value is constituted by the assist force by said motor output on the basis of said current command value stored in said memory means just before said electric abnormality is detected.

7. An electric power steering apparatus comprising:

a motor outputting an assist force capable of assisting a steering operation by a steering wheel;

a torque sensor detecting a steering torque by said steering wheel;

a computing means for computing a current command value of said motor on the basis of said steering torque; and a control means for controlling a generation of the assist force by said motor on the basis of said current command value, wherein the electric power steering apparatus comprises:

an abnormality detecting means for detecting an electric abnormality of at least one of hardwares including said motor, said torque sensor, said computing means, said control means and connecting means for electrically connecting them respectively;

an abnormal time control means for controlling said control means in such a manner that an output of the assist force by said motor is reduced in the case that the electric abnormality of said hardware is detected by said abnormality detecting means;

a clocking means for measuring an abnormality duration from a time when the electric abnormality of said hardware is detected by said abnormality detecting means to a time when said electric abnormality is not detected, and a reset time control means for controlling said control means on the basis of said abnormality duration in such a manner that a speed for increasing the output of the assist force by said motor to a predetermined reset value becomes faster in accordance with said abnormality duration being shorter and becomes slower in accordance with said abnormality duration being longer, in the case that said electric abnormality is not detected by said abnormality detecting means after detecting the electric abnormality of said hardware by said abnormality detecting means.

8. An electric power steering apparatus as claimed in claim 7, further comprising a memory means for storing the current command value of said motor, wherein in the case that said abnormality duration is less than a predetermined time, said predetermined reset value is constituted by the assist force by said motor output on the basis of said current command value stored in said memory means just before said electric abnormality is detected.

* * * * *